US010345104B2

(12) United States Patent
Barone et al.

(10) Patent No.: US 10,345,104 B2
(45) Date of Patent: Jul. 9, 2019

(54) METHOD FOR THE MEASUREMENT OF ANGULAR AND/OR LINEAR DISPLACEMENTS UTILIZING ONE OR MORE FOLDED PENDULA

(71) Applicant: UNIVERSITÀ DEGLI STUDI DI SALERNO, Fisciano (IT)

(72) Inventors: Fabrizio Barone, Fisciano (IT); Fausto Acernese, Fisciano (IT); Gerardo Giordano, Fisciano (IT)

(73) Assignee: UNIVERSITÀ DEGLI STUDI DI SALERNO, Fisciano (IT)

( * ) Notice: Subject to any disclaimer, the term of this patent is extended or adjusted under 35 U.S.C. 154(b) by 200 days.

(21) Appl. No.: 15/500,852

(22) PCT Filed: Aug. 4, 2015

(86) PCT No.: PCT/IT2015/000194
§ 371 (c)(1),
(2) Date: Jan. 31, 2017

(87) PCT Pub. No.: WO2016/020947
PCT Pub. Date: Feb. 11, 2016

(65) Prior Publication Data
US 2017/0219348 A1    Aug. 3, 2017

(30) Foreign Application Priority Data

Aug. 6, 2014   (IT) .............................. RM2014A0460

(51) Int. Cl.
*G01B 5/24*     (2006.01)
*G01V 1/18*     (2006.01)
(Continued)

(52) U.S. Cl.
CPC ............... *G01C 19/56* (2013.01); *G01B 5/24* (2013.01); *G01V 1/18* (2013.01); *G01P 2015/0805* (2013.01)

(58) Field of Classification Search
CPC . G01C 19/56; G01B 5/24; G01V 1/18; G01V 1/162; G01H 1/00; G01P 2012/0805; G01P 2015/0805
See application file for complete search history.

(56) References Cited

U.S. PATENT DOCUMENTS

| 8,950,263 B2* | 2/2015 | Giordano ................. G01H 1/00 367/179 |
| 9,256,000 B2* | 2/2016 | Barone ..................... G01V 1/18 |
| 2014/0036637 A1 | 2/2014 | Barone Fabrizio |

FOREIGN PATENT DOCUMENTS

| WO | 2011/004413 A2 | 1/2011 |
| WO | 2012-147112 A2 | 11/2012 |

OTHER PUBLICATIONS

E. Ferguson, Kinematics of Mechanisms, From the Time of Watt, Contributions for the Museum of History and Technology, Bulletin 228, pp. 186-229 (1962).

(Continued)

*Primary Examiner* — Jill E Culler
*Assistant Examiner* — Leo T Hinze
(74) *Attorney, Agent, or Firm* — Timothy X. Gibson; Gibson & Dernier LLP

(57) ABSTRACT

Systems are disclosed for the combined measurement of linear and angular displacements, with high sensitivity, wide measurement band at low frequency based on the configuration of the folded pendulum, and a linear and angular displacement sensor for applications of monitoring and control. Examples of possible applications of the combined sensor subject-matter of the present invention are sensor for the seismic monitoring, sensor for systems of monitoring and/or control of civil and industrial buildings, dykes, bridges, tunnels, etc., sensor for system of monitoring and/or control for the realization of systems of seismic attenuation and inertial platforms.

6 Claims, 8 Drawing Sheets

(51) Int. Cl.
  *G01C 19/56* (2012.01)
  *G01P 15/08* (2006.01)

(56) References Cited

OTHER PUBLICATIONS

Fan, S., Cai Y., Wu S., and Luo, J., and Hsu, H. Response of a folded pendulum to tilt tides. Physics Letters A 256, 132-140 (1999).
Bertolini, A., DeSalvo, R., Fidecaro, F. and Takamori, A. Monolithic Folded Pendulum Accelerometers for Seismic Monitoring and Active Isolation Systems. IEEE Transactions on Geoscience and Remote Sensing, 44, 273-276 (2006).
Bertolini, A., DeSalvo, R., Fidecaro, F., Francesconi, M., Marka, S., Sannibale, V., Simonetti, D., Takamori, A., Tariq, H. Mechanical design of a single-axis monolithic accelerometer for advanced seismic attenuation systems. Nuclear Instruments and Methods in Physics Research A 556, pp. 616-623 (2006).
Acernese, F., Giordano, G., Romano, R., De Rosa, R., Barone, F. Mechanical monolithic horizontal sensor for low frequency seismic noise measurement. Review of Scientific Instruments 79, 074501, 8 pages (2008).
Acernese F., Giordano, G., Romano, R., De Rosa, R., Barone, F. Tunable mechanical monolithic sensor with interferometric readout for low frequency seismic noise measurement. Nuclear Instruments and Methods in Physics Research. A 617, 457-458, ISSN: 0168-9002, 2 pages (2010).
Acernese, F., De Rosa, R., Giordano, G., Romano, R., Vilasi, S., Barone, F. Low Frequency—High Sensitivity Horizontal Inertial Sensor based on Folded Pendulum. Journal of Physics: Conference Series 363, 012001 10 pages (2012).
Acernese, F., De Rosa, R., Giordano, G., Romano, R., Barone, F. Low frequency/high sensitivity horizontal monolithic sensor. Proc. of SPIE vol. 8345, 83453F 9 pages, (2012).
Acernese, F., De Rosa, R., Garufi, F., Giordano, G., Romano, R., Barone, F. Tunable mechanical monolithic horizontal sensor with high Q for low frequency seismic noise measurement. Journ. of Phys. Conf. Series 228, 0120351 pp. 1-6 (2010).
D'Oreye, N.F., Zürn, W. Very high reslution long-baseline watertube tiltmeter to record small signals from Earth free oscillations up to secular tilts. Rev. Sci. Instrum. 76, 024501-1, 13 pages (2005).
Anderson, G., Constable, S. Staudigel, Wyatt, F.K. A seafloor long-baseline tiltmeter. J. Geophys. Res. 102, No. B9, pp. 20269-20285 (1997).
Tolstoy, M., Constable, S., Orcutt, J., Staudigel, H., Wyatt, F.K., Anderson, G.. Short and long baseline tiltmeter measurements on axial seamount, Juan de Fuca Ridge, Physics of the Earth and Planetary Interiors 108, pp. 129-141, (1998).
Xing, Y.Z., Schneider, F. A bubble-level tilt sensor with a large measurement range. Sensors and Actuators. 17, pp. 339-344, (1989).
Giazotto, A. Tilt meter as a tilt-independent accelerometer. Physics Letters A 376, pp. 667-670, (2012).
Venkateswara, K., Hagedorn, C.A., Turner, M.D., Arp, T., Gundlach, J.H. High-precision mechanical absolute-rotation sensor. arXiv:1401.4412v1 [physics.ins-det], 8 pages (2014).
Bertolini A., High sensitivity accelerometers for gravity experiments, tesi di dottorato, XIII ciclo, Università di Pisa, LIGO-P010009-00-Z 138 pages (2001).
Liu, J., Li, J. and Blair, D.G., 1997. Vibration isolation performance of an ultra-low frequency folded pendulum resonator. Physics Letters A 228, pp. 243-249, (1997).
Eleuteri, A., Milano, L., De Rosa, R., Garufi, F., Acernese, F., Barone, F., Giordano, L., Pardi, S. Adaptive filters for detection of gravitational waves from coalescing binaries. Physical Review D 73, 122004 12 pages, (2006).
Acernese, F., De Rosa, R., Giordano, G., Romano, R., Barone, F. Mechanical monolithic tiltmeter for low frequency measurements, Proc. of SPIE vol. 8345, 83453E, 8 pages (2012).
Acernese, F., Canonico, R., De Rosa, R., Giordano, G., Romano, R., Barone, F., Mechanical monolithic tiltmeter for low Frequency measurements, Proc. SPIE vol. 8692, 86923J, 8 pages (2013).
Akiteru Takamori, et al. Novel Compact Tiltmeter for ocean bottom and other frontier observations, Measurement Science and Technology 22 115901, 7 pages (2011).
Wu Shuchao, Folded pendulunm tiltmeter, Review of Scientific Instruments vol. 73, No. 5, 2150-2156 (2002).
Search Report and Written Opinion for corresponding IT application No. IT RM20140460, 10 pages, dated Apr. 7, 2015.
Search Report and Written Opinion for corresponding PCT Application No. PCT/IT2015/000194, 14 pages, dated Dec. 2, 2015.
Acernese, F., De Rosa, R., Giordano, G., Romano, R., Barone, F. Very Low frequency/high sensitivity triaxial monolithic inertial sensor. Proc. of SPIE vol. 9061, 90612H-1 12 pages, (2014).

* cited by examiner

Tait - Bryan angle (sequence of pitch- roll- yaw (YXZ))

Rotation around the Y axis (pitch)

Rotation around the X axis (roll)

Rotation around the Z axis (yaw)

Sequence YXZ of Tait - Bryan for the generic sensor oriented as in Fig.1

METHOD FOR THE MEASUREMENT OF ANGULAR AND/OR LINEAR DISPLACEMENTS UTILIZING ONE OR MORE FOLDED PENDULA

FIELD OF THE INVENTION

The present invention concerns a method for the measurement of angular and/or linear displacements utilizing one or more folded pendula.

The present invention concerns a system for the combined measurement of linear and angular displacements, with high sensitivity, wide measurement band at low frequency based on the configuration of the folded pendulum [1], and a linear and angular displacement sensor for applications of monitoring and control. Examples of possible applications of the combined sensor subject-matter of the present invention are sensor for the seismic monitoring, sensor for systems of monitoring and/or control of civil and industrial buildings, dykes, bridges, tunnels, etc., sensor for system of monitoring and/or control for the realization of systems of seismic attenuation and inertial platforms. More precisely, the present invention consists in an innovative and general methodology for extracting the angular displacement signal from a sensor based on the classical architecture of the folded pendulum. Such a technique solves the problem, not solved as of yet in the folded pendulum, of decoupling and extracting independently the signals generated by forces that are parallel to the motion of the central mass and the signals generated by the angular displacements (tilts), unsolved problem that is present in all its realizations as displacement and/or angular sensor described in literature, that limits its effective and extensive utilization [2-5].

Since the technique of extraction of the angular displacement described in the present invention is totally independent from the technique of extraction of the linear signal, the latter being widely described in literature [2-13], it is object of the present invention also that of providing a combined sensor allowing to concurrently extract, and in a way totally independent, both the angular displacement signal and the linear displacement signal (component of the relative motion of the central mass with respect to the support of the system due to forces acting parallel to the base of the same support), and, therefore, geometrically combining a plurality of sensors, even the relevant horizontal and vertical components, defined, respectively, by the plane perpendicular and the direction parallel to the gravity acceleration vector, $\vec{g}$.

Finally, taking into account the full scalability of the sensor (which allows realizations that are even very compact), the characteristics of tuneability of the resonance frequency (realizable by various techniques [6-13]), the high decoupling between the various mechanical degrees of freedom and the poor sensitivity to the ambient noises, it is object of the present invention to provide a combined sensor fully adaptable in terms of dimensions, sensitivity measurement band for the seismic monitoring, sensor for systems of monitoring and/or control of civil and industrial buildings, dykes, bridges, tunnels, etc., sensor for systems of monitoring and/or control for systems of seismic attenuation and inertial platforms.

BACKGROUND

The sensors of angular position (tiltmeters) are widely used not only for scientific applications but also for industrial and civil applications. Typical applications of the sensors of angular position, wherein a highest sensitivity and accuracy of the measurements is requested in the low frequencies band, are, for example, both in the scientific domain (monitoring of the ground elastic deformations, terrestrial tides, etc.) both in the civil and industrial domains (monitoring of dykes, tunnels, bridges, mines, monuments and buildings, even in relation to the evaluation of the seismic risk).

The current classification of the existing instruments is effected on the basis of the length of the base of the instrument: long-base and short-base sensors. The angular short-base sensors have the great advantage of being easily installable, but have the disadvantage of being more sensible to the non-homogeneities and the local perturbations, as well as the local perturbations of the environmental and/or meteorological type. The long-base angular sensors, although obviously more complex to install, more expensive and more sensible to the meteorological-type perturbations, provide more accurate and stable measurements of angular displacements, provided that, however, the sites are suitable and the fixing to ground of the sensors are appropriately designed [14-19].

A typical example of angular long-base sensor is the "water-tube tiltmeter" [14], whose sensitivity depends on the horizontal distance between two water containers: the larger is the distance, the greater is the sensitivity. The other side of the coin is the fact that a liquid angular displacement sensor (tiltmeter) detects only a mean value of the tilts on a large scale. Moreover, these instruments are largely influenced by the ambient conditions (e.g. liquid density variations due to temperature variations, surface tensions acting on the walls of the liquid containers, asymmetry of the containers and the transducers), which make difficult the achieving of high sensitivities.

Typical examples of short-base sensors are the pendula, the diamagnetic and bubble angular sensors [17-19]. Even such sensors present problems of sensitivity, stability along time, decoupling of the angular position signal from the other degrees of freedom, decoupling with the ambient noises that could be remarkably reduced in the assumption of utilizing architectures of the starting sensor which unite the sensitivity of the long-base sensors, the compactness of the short-base sensors, with the ensuing smaller sensitivity to the ambient noises and an effective decoupling between the degrees of freedom.

A possible architecture is that of the folded pendulum, as a matter of fact a low-frequency oscillating system based on the Watt-linkage [1], realized also in the monolithic form with mechanical working by milling and electro-erosion, both in the classical experimental version with joints in tension [6-8], and in the version with a pair of joints in compression [9], and in the new vertical version [10]. Such an architecture guarantees the realization of sensors characterized by a wide measurement band coupled with a highest sensitivity in the band of low frequencies, full dimensional scalability of the sensor, full tuneability of the resonance frequency, high mechanical quality factors, reduced problems of coupling between the various degrees of freedom and reduced sensitivity to the ambient noises, also as a consequence of an efficient system of reading the output signal, the system being based on optic-electronic methods, such as, for example, optical levers or laser interferometers [7-13].

It is well known, however, that the output signal obtained by reading the relative motion of the central mass with respect to the pendulum support, as obtained in all the configurations realized as of yet and described in literature

[1-13], is a combination of the linear displacement (component of the relative motion of the central mass with respect to the pendulum support due to forces acting parallel to the base of the same support) and the angular displacement (tilt) of the support base.

Indeed, making reference to FIG. 1, all the existing techniques and methodologies relevant to the folded pendulum, both for the measurement of horizontal displacements (and/or accelerations), vertical displacements (and/or accelerations) and angular displacements (and/or accelerations) are based on the only direct measurements of the displacement of the central mass ($m_c$) with respect to the support (F). Such a support is rigidly fixed to the surface of which one wishes to measure the linear and/or angular displacements, constituting with it an only rigid block and, therefore, following its displacements in a rigid way. Accordingly, the measurement of the displacement of the central mass with respect to the support is a direct measurement of the displacement of the central mass (test mass) with respect to the surface. The problem that the current systems do not allow to solve is that the signals in input to each folded pendulum are in theory three (horizontal, vertical and angular displacements) but the reading system acquires only a combination of them [2-5]. The system is clearly undetermined: it is not mathematically possible in any manner to obtain, starting from an only reading signal, the three input signals, unless one makes very severe assumptions on the latter or one modifies the performances of the instrument in such a way to maximize the signal-to-noise ratio of a signal with respect to the others.

Only in some particular cases it has been possible to solve the problem in a partial way, for example in the case wherein the linear and angular displacements are ideally separated in band, or under the assumption to use concurrently also an independent sensor (tiltmeter) of only angular displacement having comparable sensitivity (with evident technical problems connected to different sensitivities, stability and calibration criticalities).

Indeed, in the article of Takamori et al. [5], the authors utilize the folded pendulum in a classical way by fixing the support rigidly to the surface whose angular displacements are to be measured along time, and measure the displacement of the central mass with respect to the support. In particular, they highlight the already well known equivalence of the folded pendulum with respect to a classical pendulum with equivalent length, $l_{eq}$ (equation 1 in the article), and period $T_0$ (equation 2 in the article), fixed in the suspension point to the surface whose angular displacement is to be measured.

As described in the article, and well known in the literature, by keeping the same notation utilized there, a rotation of an angle $\Delta\vartheta$ of the reference plane, to which the pendulum is fixed, around an axis perpendicular to the plane on which occurs the motion of the folded pendulum generates a measurable quantity, i.e. a displacement of the central mass relatively to the support, $\Delta d$, that can be expressed by the trigonometric relationship $\Delta d = l_{eq} \cdot \Delta\vartheta$ for sufficiently small $\Delta\vartheta$.

It is important to stress that the period utilized in the paper of Takamori, that is the inverse ratio of the natural resonance frequency of the folded pendulum, is considered constant independently from any possible time variation of the inclination angle of the support with respect to the plane perpendicular to the gravity force vector, $\vec{g}$, and, therefore, the result of the measurement is independent of the variation of such a period.

It is, however, as much known and scientifically well-established that the measurement of the relative displacement of the central mass with respect to the support, fixed to ground, is not per se sufficient for the carrying-out of a univocal measurement of angular displacement. Indeed, it has been scientifically demonstrated also in the article of Takamori, that the measurement of the relative displacement between central mass and support is a combination of angular displacement and linear displacements (coupling between the horizontal motion of the plane and the vertical motion of the plane as referred to the direction of the gravitational acceleration vector $\vec{g}$). Moreover, it is not possible by means of a single measurement to decouple a linear motion from an angular one, and subsequently from the linear motion decouple the horizontal and vertical local components. This, besides being easily derivable from the papers is mathematically unexceptionable. However, whilst it is not possible to have a static displacement of the central mass (test mass) (except for the case of a constant acceleration), it is instead possible to have a static angular displacement, as a consequence of the presence of the gravitational acceleration. It is here stressed that the foregoing is valid only in the static case: dynamical angular displacements cannot be instead in no way distinguished from dynamical linear displacements.

As a demonstration of the foregoing, the authors of [5] are forced to take into account this problem. Indeed, they discuss the consequences of a micro-seism on their measurement. The micro-seism they are speaking of, close to the resonance frequency of the pendulum, is for them a great problem for two reasons:

1. If the linear micro-seism is large, it does not allow them to measure the angular displacement in a correct way, since the output signal measured by them is a combination of the signals of linear and angular displacement.

2. In particular, if the micro-seism is close to the resonance frequency, this signal makes the pendulum oscillate, creating problems not only of de-coupling, but also of dynamics, which in the sensor developed by them is relatively small (see the figures of the article).

The solution implemented by Takamori et al. is to damp the oscillations of the sensor to the end of annul any possibility of triggering oscillations in the sensor (by reducing the quality factor to Q=1 by means of magnetic dampers) and carry out only measurements of very long period, in the frequency band wherein one presumes that the linear seismic signal is sufficiently small to be considered small with respect to the signal of angular displacement.

The limitations of that method, as well as the complexity of its application, are evident.

SUMMARY OF THE INVENTION

It is object of the present invention to provide a method, which allows to measure univocally the angular displacement signal (and in general the angular motion signal) of a folded pendulum. Such a method is based on the measurement of the variation of the natural, instantaneous resonance frequency of the folded pendulum, by using models of angular position—resonance frequency, which are derived theoretically both by analytical and numerical approaches (to be specialized for the single pendula), or experimentally (from measurements on single folded pendula).

It is, moreover, object of the present invention to provide a method which, independently from the utilized technique for carrying out the measurement of the resonance frequency and independently from the specific model establishing the relationship between angular position of the folded pendulum and its resonance frequency, allows to realize an angular displacement sensor (and, in general, an angular motion sensor) by using the architecture of a folded pendulum.

It is further specific object of the present invention, finally, to provide an angular displacement sensor (and, in general, an angular motion sensor) for monitoring and controlling based on the folded pendulum, and a method for extracting the angular position signal from the same sensor, which solves the problems and overcomes the drawbacks of the prior art.

Further, it is object of the present invention to provide a method for finding the local horizontal, as well as a method to concurrently measure the linear and angular displacements of a plane with respect to a reference plane.

It is subject-matter of the present invention methods sharing the same inventive technical concept, according to the embodiments disclosed herein, here integrally included by reference.

BRIEF DESCRIPTION OF THE DRAWINGS

The invention will be now described by way of illustration but not by way of limitation, making reference to the figures of the enclosed drawings, wherein.

DETAILED DESCRIPTION

Principle of Functioning of the Invention

Figure 1:
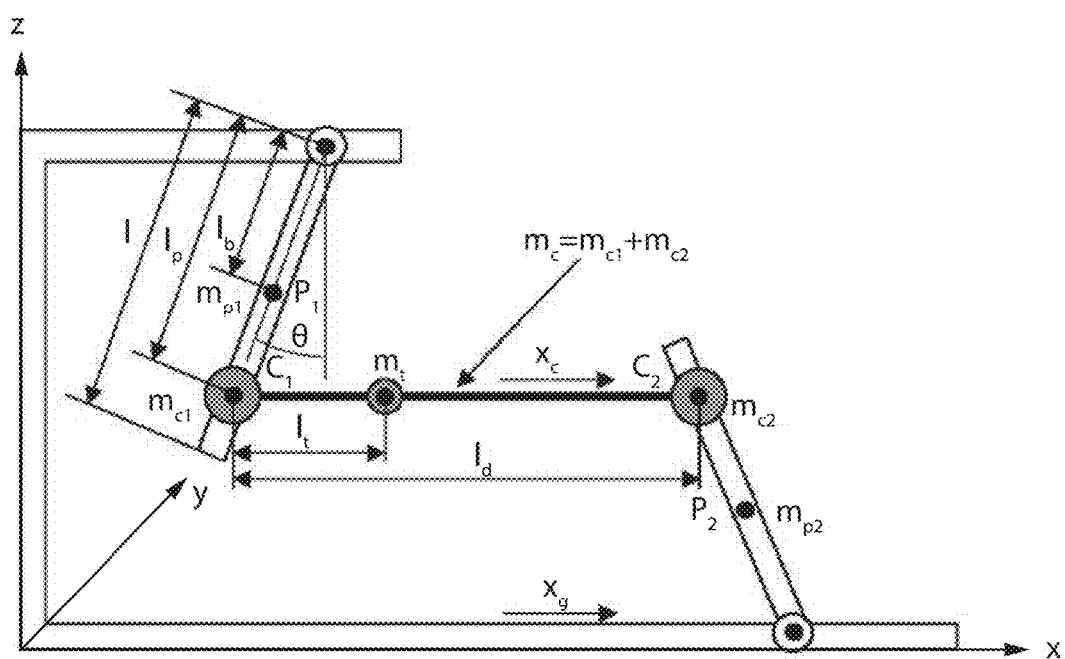
FIG. 1 shows the principle mechanical model of the folded pendulum according to the prior art.

The innovation principle of the angular motion/position sensor based on the folded pendulum, the sensor having high sensitivity and wide measurement band, arises from the original monolithic seismic sensor model termed "folded pendulum", described in [1], and the subsequent and effective improvements of the models and technology as described in [11] and [12], even by means of two innovative realizations that already led to two International patent applications for a horizontal [9] and vertical [10] folded pendulum.

As it will be described in detail in the following, such an angular displacement sensor based on the folded pendulum has been invented as a consequence of an interpretation, that is totally innovative and never discussed in literature, of the equations describing the behavior of the horizontal folded pendulum as known in literature [2-13], interpretation which constitutes a real innovative model.

The validity of such an interpretation of the model and the mathematical formulation of the new model describing it has been tested by one of the possible realizations of the same, which by the way wholly verifies the new model at the basis of the invention. The scientific and technological results, that have been achieved and are described in the following, allow to pave the way to a new scientific and technological progress for the realization of seismic sensor for angular displacement (and, in general, for angular motion) that are compact, with high sensitivity and low sensitivity to the ambient noises.

Finally, it is to be specified that the method described in the present invention can be applied with any type of folded pendulum, in particular with that of the Patent application WO11004413, with elliptic, circular joints or any type of joints.

Starting point of the description of the angular sensor based on the folded pendulum is the principle configuration termed Watt-linkage, from which the folded pendulum arises, configuration that is well-known in literature. In the following, the model of folded pendulum will be described in detail, being such a model a basic element in the description of the technique subject-matter of the invention, also to stress the deep differences between the known models and the ones described for the first time in this document and on which the present invention is based.

The Classical Model of Folded Pendulum

An accurate description of the horizontal folded pendulum dynamics is given by the simplified Lagrangian model of Bertolini [20] based on the model of Liu et al. [21], subsequently widened by Acernese et al. [13], and referred to the principle mechanical model shown in FIG. 1. Such a mechanical model is constituted by two rigid vertical arms of equal length, l, connected to an only one support F, the arms forming a pendulum (termed also simple pendulum, SP, in the following) of mass $m_{p_1}$ and an inverted pendulum (termed also inverted pendulum, IP, in the following) of mass $m_{p_2}$. The masses of the pendula are concentrated in their centers of mass, $P_1$ and $P_2$, respectively, at $l_b=l/2$ and connected with each other at $C_1$ and $C_2$, by means of a central mass, $m_c$, modeled, instead, by means of two equivalent masses, $m_{c_1}$ and $m_{c_2}$ ($m_c=m_{c_1}+m_{c_2}$) respectively at the same distance, $l_p$, as measured from the rotation points of the arms of the pendulum and inverted pendulum. The distance between the rotation points, $C_1$ and $C_2$, is fixed and is equal to $l_d$. It is stressed that such a Lagrangian model, based on the principle mechanical model of the folded pendulum, shown in FIG. 1, considers the pendula and the central mass as two-dimensional bars and point-like rotational joints. In fact, a more accurate model necessarily depends on the single realization scheme, utilized for the experimental realizations. Hence, the principle functioning of the model is not constrained to the geometrical assumptions made, even if the latter are in any case very well approximated by many realizations of sensors based on a folded pendulum architecture [2-13].

The simplified Lagrangian model of Bertolini [20] is described for small deflection angles, θ, positive for anti-clockwise rotations of the simple pendulum with respect to the direction of the local vertical, by the classical Lagrangian expressed by:

$$\Lambda = T - U \quad (1)$$

T being the approximated analytical expression of the kinetic energy:

$$T = \frac{1}{2}(J_1+J_2)\dot{\theta}^2 + \frac{1}{2}(m_{p_1}+m_{p_2})\dot{x}_p^2 + \frac{1}{2}(m_{c_1}+m_{c_2})\dot{x}_c^2 \quad (1\text{-a})$$

with $J_1$ and $J_2$ inertia momentums of the two arms, $\dot{x}_p$ and $\dot{x}_c$ are the speeds of the centers of mass of the arms and central mass, respectively, and U being the approximated analytical expression of the potential energy:

$$U = \frac{1}{2}\left[\frac{1}{2}(m_{p_1}-m_{p_2})gl + (m_{c_1}-m_{c_2})gl_p + k_\theta\right]\theta^2 \quad (1\text{-b})$$

with $k_\theta$ global elastic constant of the joints, $x_p$ co-ordinate of the points of junction with the connection bar of the arms and $x_c$ the coordinate of the center of mass of the arms.

It is to be observed and stressed that here the expression of the potential Energy has been modeled only in the case of a folded pendulum which is ideally positioned horizontally on the plane.

The classical solution of the equation of motion by using a Lagrangian, $\Lambda$ [equation (1)], keeping only the terms of the first order in the approximation of small displacements, has allowed to demonstrate that, for small angles of deflection, θ, the functioning of a folded pendulum can be considered fully equivalent to that of a classical pendulum (and, therefore, of a classical system of the second order) with respect to external stresses having natural resonance frequency, $f_o$, equal to:

$$f_o = \frac{\omega_o}{2\pi} = \frac{1}{2\pi}\sqrt{\frac{K_{g_{eq}}+K_{e_{eq}}}{M_{eq}}} = \frac{1}{2\pi}\sqrt{\frac{K_{eq}}{M_{eq}}} \quad (2)$$

wherein $K_{g_{eq}}$ is the gravitational equivalent elastic constant, that is function of the geometrical and inertial characteristics of the folded pendulum in the presence of the gravitational acceleration, and $K_{e_{eq}}$ is the equivalent elastic constant as generated by the flexure of the suspension joints, the constants being defined, respectively, as $$K_{g_{eq}} = (m_{p_1}-m_{p_2})\frac{gl}{l_p^2} + (m_{c_1}-m_{c_2})\frac{g}{l_p} \quad (3)$$

$$K_{e_{eq}} = \frac{k_\theta}{l_p^2} \quad (4)$$

and wherein $M_{eq}$ is the equivalent mass, defined as $$M_{eq} = (m_{p_1}+m_{p_2})\frac{l^2}{3l_p^2} + (m_{c_1}+m_{c_2}) \quad (5)$$

Equation (2) is the classical expression of the resonance frequency of a mass-spring oscillator with an equivalent elastic constant equal to $K_{eq}$ and mass $M_{eq}$. In particular, equation (3) shows that the gravitational equivalent elastic constant, $K_{g_{eq}}$, may assume both positive and negative values. Negative values of the latter have the effect of reducing the value of the natural resonance frequency, because they compensate for the equivalent elastic constant.

The resonance frequency can be defined in the designing step, determining, for example, the value of the gravitational equivalent elastic constant and designing the mechanical part in accordance with the model defined by the equation (3), however it can be also modified on folded pendulum existing realizations (for example, in order to effect optimizations of the performances of specific applications). To this end, a specifically developed calibration procedure may be used, which utilizes a calibration mass, $m_t$, discussed in the following by way of completeness, or by a specific, ad-hoc developed procedure, which is described in [10]. It is important to stress that the sensitivity of the folded pendulum as angular position sensor (tiltmeter) is in any case strongly dependent on its resonance frequency, which limits its measurement band, as it will be clarified in the following, as well as it is important to stress that the procedure of calibration of the resonance frequencies can be utilized, not only to reduce, but also to increase the natural resonance frequency of the folded pendulum.

The addition of a calibration mass, $m_t$, positioned at a distance $l_t$ from the rotation point of the pendulum-central mass, $C_1$, as shown in FIG. 1, modifies the values of the equivalent mass $m_{c_1}$ and $m_{c_2}$, which are increased by fractions of the calibration mass which are determined by its position, $l_t$, on the basis of the relationships:

$$\Delta m_{c_1} = m_t\left(1-\frac{l_t}{l_d}\right) \quad (6)$$

$$\Delta m_{c_2} = m_t\left(\frac{l_t}{l_d}\right) \quad (7)$$

The gravitational equivalent elastic constant, $K_{g_{eq}}$, and the equivalent mass, $M_{eq}$, vary accordingly, in the following way:

$$\Delta K_{g_{eq}} = (\Delta m_{c_1} - \Delta m_{c_2})\frac{g}{l_p} = m_t\left(1-\frac{2l_t}{l_d}\right) \quad (8)$$

$$\Delta M_{eq} = m_t \quad (9)$$

modifying the value of the natural resonance frequency of the folded pendulum. It is easy to verify that, whilst the equivalent mass, $M_{eq}$, increases as a consequence of the always positive increment $\Delta M_{eq}$ [equation (9)], the gravitational equivalent elastic constant, $K_{g_{eq}}$, may, instead, both increase or decrease on the basis of position and value of the calibration mass [equation (8)]. This feature guarantees the possibility to vary (increasing or decreasing) the natural resonance frequency of the pendulum, $f_o$, by simply varying the position, $l_t$, of the calibration mass.

It is important to stress the importance of the calibration sensitivity of the folded pendulum for an easy and stable calibration. This sensitivity is obtained by deriving the equation (2) with respect to the position of the calibration mass, obtaining [13]:

$$S_{f_o} = \frac{df_o}{dl_t} = \frac{g}{2\pi l_d l_p} \frac{m_t}{\sqrt{M_{eq}K_{eq}}} \quad (10)$$

wherein $S_{f_o}$ is the sensitivity of calibration at the resonance frequencies.

As expected, equation (10) demonstrates that the sensitivity to the variation of the resonance frequency, $f_o$, of the folded pendulum is a function of the value of the calibration mass, $m_t$, and that, to obtain the same variation of the resonance frequency, $\Delta f_o$, the larger is the value of the calibration mass, the smaller is the displacement, $\Delta l_t$, of the same calibration mass that is needed in order to obtain it.

A technique that is alternative to that of the utilization of a calibration mass, always with the aim of obtaining a fine calibration of the resonance frequency, is, instead, described in [10].

To the end of stressing in a more efficient way the folded pendulum model according to the invention that will be the subject-matter of the subsequent paragraph, it is convenient to write again in an explicit way the equation (2) by using the expressions of the equivalent elastic constants [equations (3) and (4)] and the equivalent mass [equation (5)]:

$$f_o \equiv \frac{\omega_o}{2\pi} = \frac{1}{2\pi}\sqrt{\frac{K_{eq}}{M_{eq}}} = \frac{1}{2\pi}\sqrt{\frac{K_{g_{eq}} + K_{e_{eq}}}{M_{eq}}} = \frac{1}{2\pi}\sqrt{\frac{(m_{p_1} - m_{p_2})\frac{gl}{l_p^2} + (m_{c_1} - m_{c_2})\frac{g}{l_p} + \frac{k_\theta}{l_p^2}}{(m_{p_1} + m_{p_2})\frac{l^2}{3l_p^2} + (m_{c_1} + m_{c_2})}} \quad (11)$$

$\omega_o$ being the angular velocity ($\omega_o \equiv 2\pi f_o$).

It is important to stress, at this point, that the models and the applications disclosed in the literature make reference only to schemes and models describing the application of the Watt-linkage as folded pendulum (FIG. 1) for the measurement of the horizontal displacement (horizontal motion), wherein by horizontal it is meant the ideal plane with respect to which the local gravitational acceleration vector, $\vec{g}$, is perpendicular.

Only in [10] methodologies and techniques are described which are aimed at extending the utilization of the folded pendulum for the measurement of non-horizontal displacements, characterized by a positioning of the folded pendulum at inclination angles with respect to the local horizontal that range between 0° (horizontal configuration) and 90° (vertical configuration).

In [2-5], instead, methodologies and techniques are described to extend the utilization of the folded pendulum to the measurement of angular displacements (tiltmeter), which however relate the inclination of the folded pendulum to the displacement of the equilibrium central mass, which is read by suitable devices for reading the signal with respect to the structure, considering the angular displacement as suitable to be decoupled from the horizontal one since ideally "band-separated" or, as a matter of fact, having amplitude that is much smaller than the angular one, assumptions that are not met in most cases.

The Model of Folded Pendulum According to the Invention

The methodology subject-matter of the present invention is based on the observation that the orientation variation of the folded pendulum as referred to a horizontal ideal plane varies its dynamical behavior accordingly.

It is important to stress that this effect is introduced and quantified for the first time in the Lagrangian model developed to describe the present invention, such an effect having never been theorized or experienced, as one derives from the existing literature. Indeed, to this end, an innovative physical model had to be developed, which is aimed at describing the behavior of a folded pendulum in the general case wherein the plane on which its support is fixed undergoes an angular displacement, behavior that evidently cannot be described by the model of folded pendulum known in the literature.

In particular, it is stressed that what has been derived in the model is relevant to an orientation varying along time, although slowly, but it is valid also and above all for a particular orientation and time, i.e. a static orientation.

Starting from what is reported in the previous paragraph, wherein the classical model of horizontal folded pendulum is described, the introduction of the orientation of the folded pendulum with respect to the local horizontal has the direct consequence of modifying the expression of its energy.

Figure 2:
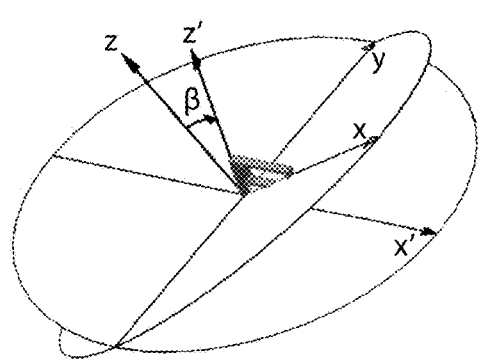
FIG. 2 shows the reference systems utilized in the description of the invention: xyz, fixed, and XYZ, integral to the support of the folded pendulum, systems that allow to describe a generic orientation (angular displacement) of the sensor by the Tait-Bryan angles for the sequence YXZ (pitch-roll-yaw)
Figure 2:
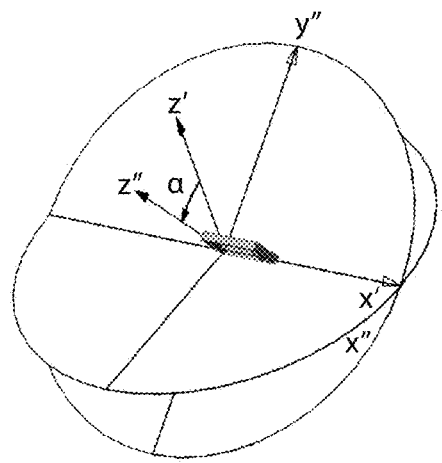
Figure 2:
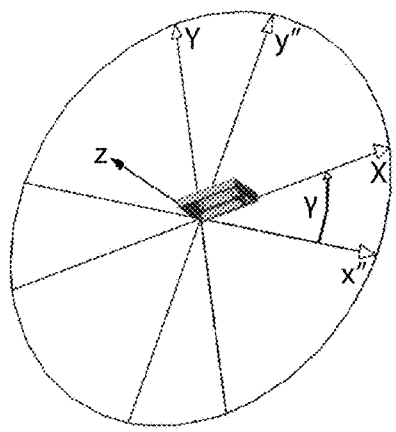
Figure 2:
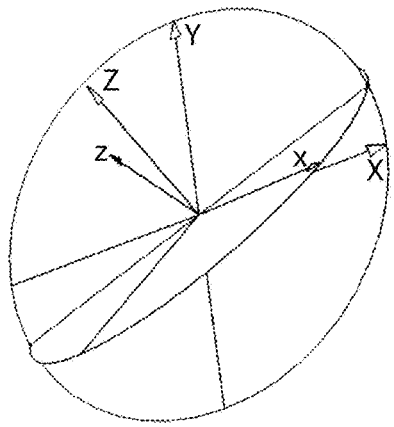
Figure 3:
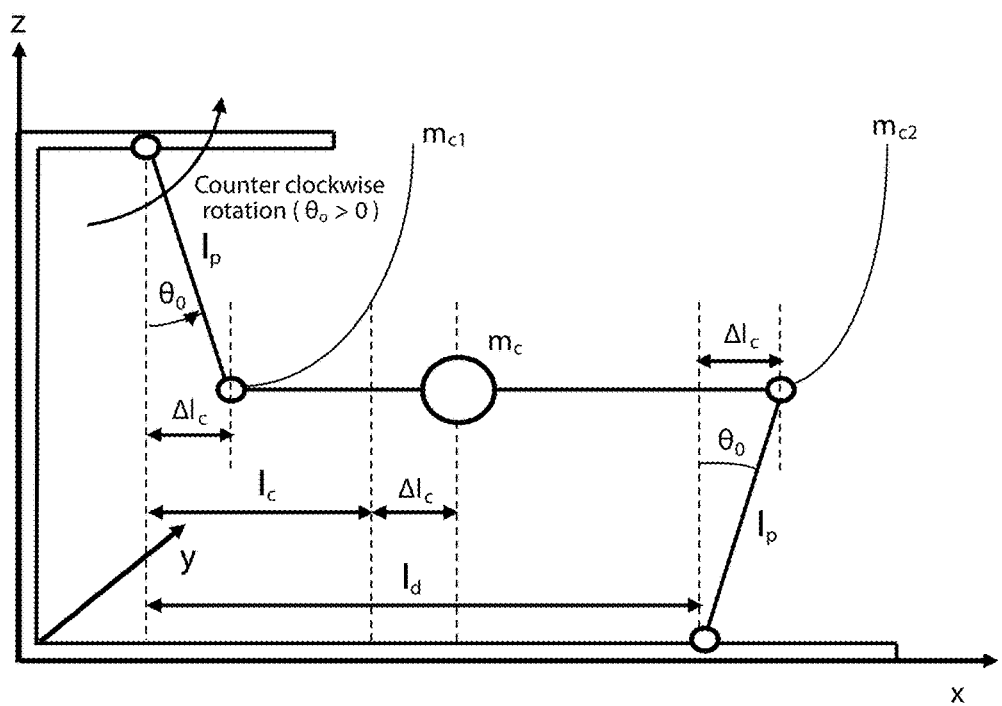
FIG. 3 shows the mechanical model utilized to describe the variation of the position of the mass center of the central mass, $\Delta l_c(\theta_o)$.

In order to describe in an efficient way the orientation of the folded pendulum with respect to the local horizontal, it is convenient to choose a fixed reference system, xyz, and a non-fixed reference system, XYZ, integral to the folded pendulum (in particular the pendulum can be positioned with the direction of oscillation of its test mass along the X axis and the motion of the simple pendulum arm, the inverted pendulum arm and the test mass in the XZ plane, as in FIG. 3). The two systems xyz and XYZ, in our description, have coinciding origins and are initially (i.e., before transformation that will be described in the following) oriented in such a way that the homologous axes are coincident (FIG. 2). This simplified geometrical configuration, although effective in the invention description, allows also not to lose generality in the modeling. Indeed, a model of more general application can be easily obtained, for example, by the only introduction of angular offsets, useful, for example, to quantify a non-vanishing angular positioning of the reference system XYZ (and, consequently, of the folded pendulum) with respect to the fixed reference system, xyz, or to quantify a non-vanishing angular positioning of the folded pendulum with respect to the same reference system, XYZ. These angular offsets will be introduced for the demonstration of specific applications of the folded pendulum.

The reference system xyz, fixed and right-handed, is oriented in such a way that the plane xy coincide with the local horizontal plane, whereas the versor, z, has the direction coinciding with that of the local gravity acceleration vector, $\vec{g}$, that has negative orientation in this reference system. Orientation and direction of vector x may be freely chosen, depending on the typology of application (for example in connection to the cardinal points, etc.).

The reference system XYZ, instead, rotates integrally to the folded pendulum. In this reference system the folded pendulum is oriented in such a way that the versor X has direction coinciding with the motion direction of the central mass of the folded pendulum, the one going from the simple pendulum to the inverted pendulum having positive orientation, the versor Z, perpendicular to X and parallel to the plane of oscillation of the pendulums, the one going from the oscillating mass of the simple pendulum to the suspension point of the simple pendulum having positive orientation, the versor Y has direction perpendicular to the motion of the central mass and parallel to the base of the support, the versor Z is, finally, perpendicular to both ones and has positive orientation, such that the system XYZ is right-handed as well. The positioning of the folded pendulum in the reference system XYZ, position $FP_1$, can be seen in FIG. 1.

The orientation of the folded pendulum can be, hence, conveniently expressed by the Tait-Bryan angles, which describe the position of the reference system integral to the sensor (XYZ) starting from the fixed system (xyz). Indeed, the angles of Tait-Bryan allow to represent any orientation of the folded pendulum in a relatively simple form in the reference system (xyz) as a sequence of 3 rotations around the axes X, Y and Z. In particular: the angle of rotation around X axis is defined as roll angle, $\alpha$; the angle of rotation around Y axis is defined as pitch angle, $\beta$; the angle of rotation around Z axis is defined yaw angle, $\gamma$. The sequence of rotation that has been chosen for our representation is the YXZ sequence (pitch-roll-yaw) (FIG. 2), that is a convenient but not limiting choice, stemmed from the physical and geometrical characteristics of the folded pendulum, as it will be explained in the following. Such a sequence, used in the present modeling without any loss of generality, is only one of the 6 possible Tait-Bryan sequences (or of the possible 12 sequences including also the Euler sequences) that can be used to describe the orientation of the folded pendulum with respect to the fixed system (xyz) and, therefore, for the analytical description of the invention.

The method of the invention is general. The Tait-Bryan description (both in the version of rotations order XYZ and in the version YXZ) is the most convenient in relation to the sensor characteristics and for the types of applications described in this document, however nothing hinder the utilization of any other rotation sequence (Euler, Tait-Bryan, etc.). For example, if one wished to utilize the Euler angles, these could always be transformed into the Tait-Brian ones, and, therefore, the present description and embodiments would keep valid.

The matrix describing mathematically the Tait-Bryan rotations sequence (YXZ) is given by the product of the three following rotation matrices:

$$R = R_\gamma R_\alpha R_\beta = \begin{pmatrix} \cos\gamma & \sin\gamma & 0 \\ -\sin\gamma & \cos\gamma & 0 \\ 0 & 0 & 1 \end{pmatrix} \begin{pmatrix} 1 & 0 & 0 \\ 0 & \cos\alpha & \sin\alpha \\ 0 & -\sin\alpha & \cos\alpha \end{pmatrix} \begin{pmatrix} \cos\beta & 0 & -\sin\beta \\ 0 & 1 & 0 \\ \sin\beta & 0 & \cos\beta \end{pmatrix} = \begin{pmatrix} \cos\gamma\cos\beta + \sin\gamma\sin\alpha\sin\beta & \sin\gamma\cos\alpha & -\cos\gamma\sin\beta + \sin\gamma\sin\alpha\cos\beta \\ -\sin\gamma\cos\beta + \cos\gamma\sin\alpha\sin\beta & \cos\gamma\cos\alpha & \sin\gamma\sin\beta + \cos\gamma\sin\alpha\cos\beta \\ \cos\alpha\sin\beta & -\sin\alpha & \cos\alpha\cos\beta \end{pmatrix} \quad (12)$$

It is important to stress that, on the basis of the above positions, the folded pendulum is positioned in any case horizontally when the roll angle, $\alpha$, and the pitch angle, $\beta$, are null, apart from angular offsets between the folded pendulum and the plane XYZ. Any orientation that is different from the horizontal one can be described by the three angles of Tait-Bryan: roll, pitch and yaw ($\alpha,\beta,\gamma$), by means of the rotations sequence YXZ. It is here repeated, however, that any sequence of rotations (Tait-Bryan, Euler, ecc.) allows the modeling and the analytical description of the methodology of the present invention, even if that of Tait-Bryan, here utilized, is the most intuitive and adapted to the physical and geometrical characteristics of the folded pendulum. The new modeling, introduced to the end of theoretically demonstrate the validity of the invention, starts from the expression of simplified Lagrangian introduced by Bertolini [equation (1)] which, it is here recalled, has been developed in the assumption of horizontally positioned folded pendulum and that, therefore, cannot take into account in any way the effects on the dynamics of the folded pendulum due to the relative variation of the gravitational acceleration direction that is consequence of a non-horizontal positioning of the pendulum.

It is important to stress that the new modeling, that is an extension of the model of Bertolini [20], will be expressed in an analytical way in the following. The new model will allow, as the classical model of Bertolini [20], to describe both qualitatively and quantitatively, in the framework of the made approximations, the behavior of a folded pendulum oriented in the space for most part of the realizations of folded pendulum made as yet and reported in the literature. It is, however, as much clear and it is to be stressed that, owing to the complex mechanical architecture of a folded pendulum, high accuracies in the previsions of the models can be obtained only by numerical modeling, which include, in the numerical Lagrangian model for the folded pendulum, also the innovative model describing the angular orientation of the folded pendulum, introduced in the following according to the followed analytical approach.

The components of the gravitational acceleration vector, $\vec{g}$, in the reference system integral to the folded pendulum, XYZ, as described in terms of the Tait-Bryan $\alpha,\beta,\gamma$ angles are expressed in vector form by:

$$g_{XYZ} = -\begin{pmatrix} -\cos\gamma\sin\beta + \sin\gamma\sin\alpha\cos\beta \\ \sin\gamma\sin\beta + \cos\gamma\sin\alpha\cos\beta \\ \cos\alpha\cos\beta \end{pmatrix} g \quad (13)$$

wherein a gravity versor (0,0,1) has been utilized.

This relationship shows that the gravitational acceleration is divided into three components acting in a different way on the dynamics of the sensor, depending on its orientation. In particular, for a folded pendulum in position $FP_1$ (defined by $\gamma=0$), i.e. with the direction of the motion of the oscillating mass in the X direction, equation (13) simplifies into $$g_{XYZ} = -\begin{pmatrix} -\sin\beta \\ \sin\alpha\cos\beta \\ \cos\alpha\cos\beta \end{pmatrix} g \quad (13\text{-}1)$$

Let us analyze the effect of the single components of the gravity acceleration along the directions of reference system XYZ on the dynamical behavior of the folded pendulum:

a. the component of the gravitational acceleration along axis X, $g_X(\alpha,\beta)$, $$g_X(\alpha,\beta) = g \sin \beta \qquad (13\text{-}1a)$$

Acts along the motion direction of the central mass, constituting as a matter of fact a forcing to the central mass in the direction itself of its motion. As it will be described in more detail in the following, this acceleration will generate a force to which the constraint reactions of the joints will be opposed.

b. The component of the gravitational acceleration along axis Y, $g_Y(\alpha)$, $$g_Y(\alpha) = -g \sin \alpha \cos \beta \qquad (13\text{-}1b)$$

acts along the direction perpendicular to the motion of the central mass, constituting, as a matter of fact, a forcing perpendicular to the joints, totally compensated by the joints themselves which, reacting as ideal constraints in this direction, impede any motion of the central mass in the direction perpendicular to the one theoretically expected. This feature of the folded pendulum, suitably confirmed by the experimental realisation made by the inventors and present in the literature, confer the high and well-known characteristics of directivity of the folded pendulum.

c. The component of the gravitational acceleration along the axis Z, $g_Z$, is the effective component of the gravitational acceleration to be used in the new Lagrangian model of the folded pendulum and is expressed by $$g_Z(\alpha,\beta) = g_{eff}(\alpha,\beta) = -g \cos \alpha \cos \beta \qquad (13\text{-}1c)$$

$g_{eff}(\alpha,\beta)$ being the value of the gravitational acceleration that we can define "effective value of the gravity acceleration", whose modulus is the value to be utilized in place of g in the expression of the simplified potential in the folded pendulum as given in (1-b). In such a way, the applicability of the simplified Lagrangian model is extended also to folded pendulums with any orientation with respect to the direction of the gravitational acceleration vector, $\vec{g}$, and defining, in such a way, and innovative physical model for the folded pendulum, whereon the present invention is based.

The introduction of the effective gravitational acceleration model, $g_{eff}(\alpha,\beta)$, in the analytical expression of the potential of the folded pendulum, U, however, is not alone sufficient to take into account in an appropriate way the effects of the relative orientation variation of the axis Z of the reference system integral to the folded pendulum, XYZ, with respect to the direction of the gravitational acceleration vector oriented along the direction z of the fixed reference system, xyz.

Such effects can be more suitably modeled analytically, in the framework of the approximations that allowed Bertolini [20] to derive the simplified analytical Lagrangian model for the description of the dynamic behavior of the folded pendulum. In the following, the new modeling will be described as well as the hypothesis whereon it is based.

Before, however, passing to the description of the model, it is important to stress, reiterating what has been said at the beginning of the present section, that it is always possible to express the foregoing and what will be explained in the following in a more general way, removing a part of or all the simplifying hypotheses allowing a simplified analytical modeling of the folded pendulum, as though very close to the reality and to the experimental realizations of folded pendulum effected as yet and reported in the literature. Naturally, the higher complexity of the folded pendulum Lagrangian will not allow simplified analytical expressions of the motion equations, but it will be always possible to construct such models and solve the motion equations in a purely numerical way, guaranteeing always a suitable quantitative description of the mechanical behavior of the single folded pendulum.

Coming back to the model, it is important to stress that the masses $m_{c_1}$ and $m_{c_2}$ used in the simplified Lagrangian model of Bertolini [20] are the masses in which the central mass:

$$m_c = m_{c_1} + m_{c_2} \qquad (14)$$

is subdivided to the end of modeling, like in the literature, and associated to the simple pendulum ($m_{c_1}$) and the inverted pendulum ($m_{c_2}$). Such subdivision is, naturally, based on the same model of distribution of the calibration mass [equations (6) and (7)], utilized to modify the natural resonance frequency of the folded pendulum. Indeed, assuming that the center of mass of the central mass is positioned at a distance $l_c$ from the joint connecting the pendulum and the central mass and that the distance between the two joints connected to the central mass is always that defined in the Bertolini model [20], $l_d$, than the value of the masses, $m_{c_1}$ and $m_{c_2}$ are derived by relationships structurally analogous those of the equations (6) and (7), i.e. (see FIG. 3):

$$m_{c_1} = \left(1 - \frac{l_c}{l_d}\right) m_c \qquad (15)$$

$$m_{c_2} = \frac{l_c}{l_d} m_c \qquad (16)$$

Naturally, such relationships, utilized in the Lagrangian model for the folded pendulum of Bertolini [20] have limited validity, because they are derived for a folded pendulum model positioned on a perfectly horizontal plane. Equation (13-1a) shows, however, that the folded pendulum is subjected to an acceleration along the direction of the motion of the central mass due to an orientation (angular displacement) of the pendulum that is different from the horizontal one and is described by the roll angle, $\alpha$, and pitch angle, $\beta$. This angular acceleration modifies the position of the central mass around which the Lagrangian must be correctly modeled.

The equation describing these new positions of the central mass, expressed by the angle $\theta_o$, which is considered positive for anticlockwise rotations of the simple pendulum with respect to the direction of the Z axis (see FIG. 3), around which the small angles, $\theta$, must be considered in the expression of the potential, U, in the hypotheses of slow angular displacements of the support of the folded pendulum, the angular displacements being such to be able to neglect the transient state, can be approximated at the first order by:

$$M_{eq} g \, l_p \sin \beta - k_\theta \theta_o = 0 \qquad (17)$$

It is important to stress that $\theta_o$ is the deflection of the joints in equilibrium conditions, and this is a consequence of the force generated by the angular orientation whose acceleration is described by the equation (13-1a). The equation (17) is in any case a good approximation also for slowly variable angular displacements, in the hypotheses of neglecting the effects of the transient state, assuming that the system shifts angularly passing through static equilibrium states. Of course, it is always possible to extend the above model to the case of rapidly varying displacements. Even if the removal of the hypotheses of slow variability of the system does not constitute a limitation for the validity of the introduced methodology, it remarkably complicates, however, the folded pendulum model, making the obtaining of solutions describing the dynamic of behavior much more complex, which are not numerical and specialized to the single physical and geometrical folded pendulum configuration.

Always in the approximation of the small angles and small angular displacements, it is easy to verify that the acceleration along the direction of motion of the central mass [equation (13-1a)], provokes, at the first order, a displacement of the center of mass of the central mass with respect to the points of the rotation joints that are integral to the support (see FIG. 3), thus modifying the values of the masses $m_{c_1}$ and $m_{c_2}$, described in equations (15) and (16). Indeed, the presence of a joints deflection angle in equilibrium conditions, $\theta_o$, that is consequence of the force generated by the angular orientation whose acceleration is described in the equation (13-1a), determines a variation of position of the mass centre of the central mass, $\Delta l_c$, that is trigonometrically derivable by the relationship:

$$\Delta l_c = \Delta l_c(\theta_o) \approx l_p \, \theta_o = \frac{M_{eq} g}{K_{e_{eq}}} \sin \beta \quad (18)$$

Wherein we utilized the definition of $K_{e_{eq}}$ given by the equation (4). Accordingly, equations (15) and (16) can be rewritten in a more general way, in order to take into account the orientation of the folded pendulum with respect to the local horizontal, as:

$$m_{c_1}(\theta_o) = m_c \left(1 - \frac{l_c + \Delta l_c(\theta_o)}{l_d}\right) \quad (19)$$

$$m_{c_2}(\theta_o) = m_c \left(\frac{l_c + \Delta l_c(\theta_o)}{l_d}\right) \quad (20)$$

with $\Delta l_c(\theta_o)$ expressed by the equation (18). Of course, in the hypothesis of $\theta_o=0$, i.e. a perfectly horizontal folded pendulum, the $m_{c_1}(0)$ in the equation (19) and the $m_{c_2}(0)$ in the equation (20) coinciding with the $m_{c_1}$ in the equation (15) and the $m_{c_2}$ in the equation (16), respectively.

Hence, the angular displacement, $\theta_o$, causes a variation of the term:

$$(m_{c_1} - m_{c_2}) \equiv (m_{c_1}(0) - m_{c_2}(0)) \quad (21)$$

that is present in the potential function, U (equation 1-b), by a quantity that is function of the roll angle, $\alpha$, and pitch angle, $\beta$, and is to be added to the expression of the potential U, the quantity being given by $$\Delta(m_{c_1} - m_{c_2}) = \Delta(m_{c_1} - m_{c_2})(\theta_o) \approx -2\frac{\Delta l_c(\theta_o)}{l_d} = -2\frac{m_c}{l_d}\frac{M_{eq} g}{K_{e_{eq}}}\sin\beta \quad (22)$$

On the basis of the previous paragraph, wherein the classical model of the folded pendulum has been described, the introduction in the model of the effects due to variation of the direction of the gravity acceleration in the reference system integral to the pendulum, which are a consequence of the variation of orientation and can be conveniently described the by the roll angle, $\alpha$, pitch angle, $\beta$, and yaw angle, $\gamma$, previously defined, has the direct consequence of modifying, extending its field of applicability, the simplified analytical expression of its potential energy, U. The expression of potential energy, U, becomes, therefore, for $\gamma=0$, $$U = U(\alpha, \beta) = \frac{1}{2}\left\{\left[\frac{1}{2}(m_{p_1} - m_{p_2})l + [(m_{c_1} - m_{c_2}) + \right.\right. \quad (1\text{-}c)$$

$$\Delta(m_{c_1} - m_{c_2})]l_p\right]g_{eff} + k_\theta\right\}\theta^2 = = \frac{1}{2}\left\{\left[\frac{1}{2}(m_{p_1} - m_{p_2})l + \right.\right.$$

$$\left.\left[(m_{c_1} - m_{c_2}) - 2\frac{m_c}{l_d}\frac{M_{eq} g}{K_{e_{eq}}}\sin\beta\right]l_p\right]g\cos\alpha\cos\beta + k_\theta\right\}\theta^2$$

Being the term $(m_{c_1} - m_{c_2})$ expressed by the equation (21) and the term $\Delta(m_{c_1} - m_{c_2})$ expressed by the equation (22). The expression of the kinetic energy of the new model, described by the equation (1-a), keeps, instead, unaltered.

Figure 6:
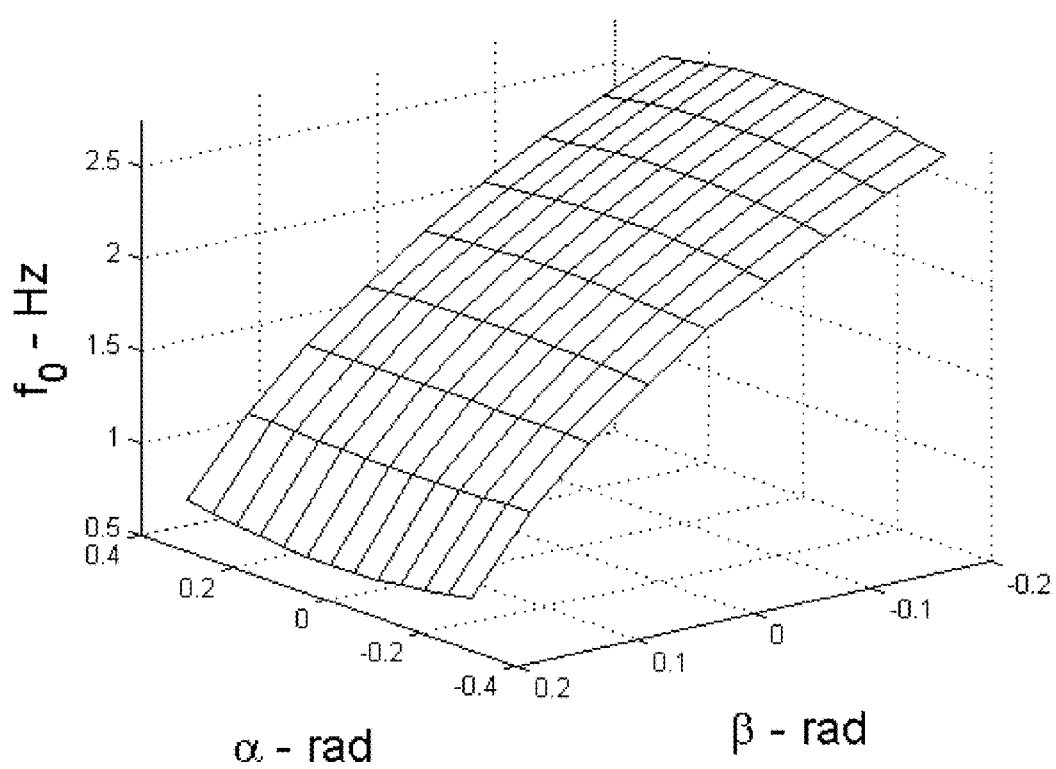
FIG. 6 provides, only by way of illustration of the present description, a possible theoretical form of the resonance frequency function for a typical monolithic folded pendulum as a function of the roll angle, $\alpha$, and pitch angle, $\beta$.

By solving the Lagrange equations [equation (1)] for the new model, utilizing the expressions of the kinetic energy (1-a) and the potential energy (1-c), in the hypotheses that have allowed to derive the previous equations of motion of the horizontal model of Bertolini [20], one verifies that the dynamic behavior of the folded pendulum can be considered always equivalent to that of a classical pendulum (and, therefore, to that of a classical system of the second-order) with natural resonance frequency, $f_o$, expressed by:

$$f_o(\alpha, \beta) = \frac{\omega_o(\alpha, \beta)}{2\pi} = \frac{1}{2\pi}\sqrt{\frac{K_{eq}(\alpha, \beta)}{M_{eq}}} = \frac{1}{2\pi}\sqrt{\frac{K_{g_{eq}}(\alpha, \beta) + K_{e_{eq}}}{M_{eq}}} \quad (23)$$

wherein the gravitational equivalent elastic constant, $K_{g_{eq}}$, is now function of the roll angle, $\alpha$, and the pitch angle, $\beta$, and is expressed by:

$$K_{g_{eq}}(\alpha, \beta) = \quad (24)$$

$$\left\{(m_{p_1} - m_{p_2})\frac{l}{l_p^2} + \left[(m_{c_1} - m_{c_2}) - 2\frac{m_c}{l_d}\frac{M_{eq} g}{K_{e_{eq}}}\sin\beta\right]\frac{1}{l_p}\right\}g\cos\alpha\cos\beta$$

whereas the equivalent elastic constant, $K_{e_{eq}}$, keeps equals to that described by the equation (4). In FIG. 6 the theoretical trend of the resonance frequency is given for a typical folded pendulum as a function of the roll angle, $\alpha$, and pitch angle, $\beta$.

This model works well for small oscillations of the test mass, i.e. for small $\theta$. It is, therefore, fully clear that an angular displacement of the folded pendulum, with respect to its initial position (or the horizontal ideal one), determines a variation of its natural resonance frequency, described by (23) for the Lagrangian model adopted and in the used approximation conditions.

The verification of the validity of such a Lagrangian model is immediate in the case of small, static or slowly variable angular displacements. It is also reaffirmed that the fact of having started from the simplified Lagrangian model hypothesized in [20], although sufficient for an effective description of all the folded pendulum realizations effected as yet, does not constitute a limitation to the process, owing to the fact that the innovative model, introduced to theoretically explain the content of the present invention and to put in relationship the direction of the gravity acceleration with the orientation of the folded pendulum, can be always introduced in any more or less complex Lagrangian model, with or without the approximations made to obtain a simple and effective analytical expression, which can be solved both analytical and numerically.

The introduction of such a model, or any other term taking into account the inclination angle, in the Lagrangian model will always generate in the Lagrangian, and therefore in the ensuing equations of motion, a dependency of the resonance frequency of the folded pendulum on the inclination angle of its support with respect to the local horizontal, that is the function that is utilized in the present model and the invention to solve the problem of the direct and univocal extraction of the angular displacement signal from a sensor such as the folded pendulum.

Summarizing, whereas the equivalent elastic constant, $K_{e_{eq}}$, is a constant depending on the joints (from the geometrical form of the joints, the material characteristics, etc.), and therefore independent from the inclination angle of the folded pendulum support, at least in the linear zone, the equivalent gravitational elastic constant, $K_{g_{eq}}$, is instead strongly dependent on the support inclination angle, varying depending on the angular positioning of the support of the folded pendulum with respect to the gravitational local vertical, in addition to the values of the geometrical and physical parameters tied to the specific design and realization of the folded pendulum.

Figure 7:
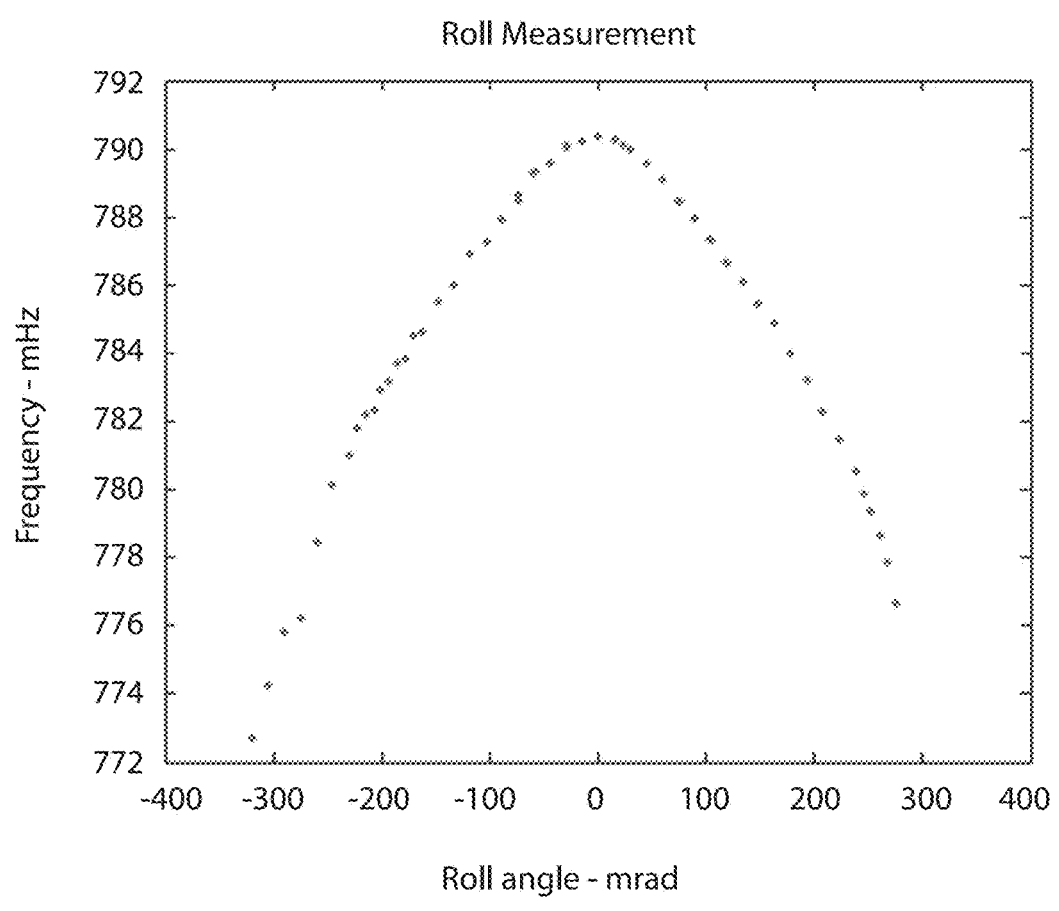
FIG. 7 shows the values of the measured natural resonance frequencies of the monolithic folded pendulum prototype, positioned in the reference system XYZ, in position $FP_1$ (as defined by $\gamma=0$), as a function of the roll angle, $\alpha$, for null pitch angle, $\beta=0$. Such a figure demonstrates, in general, the validity of the utilized model and method, confirming, in particular, the correctness of the modeling of the equivalent gravitational elastic constant $K_{g_{eq}}$, as expressed by equation (25) in the presence of the only roll.
Figure 8:
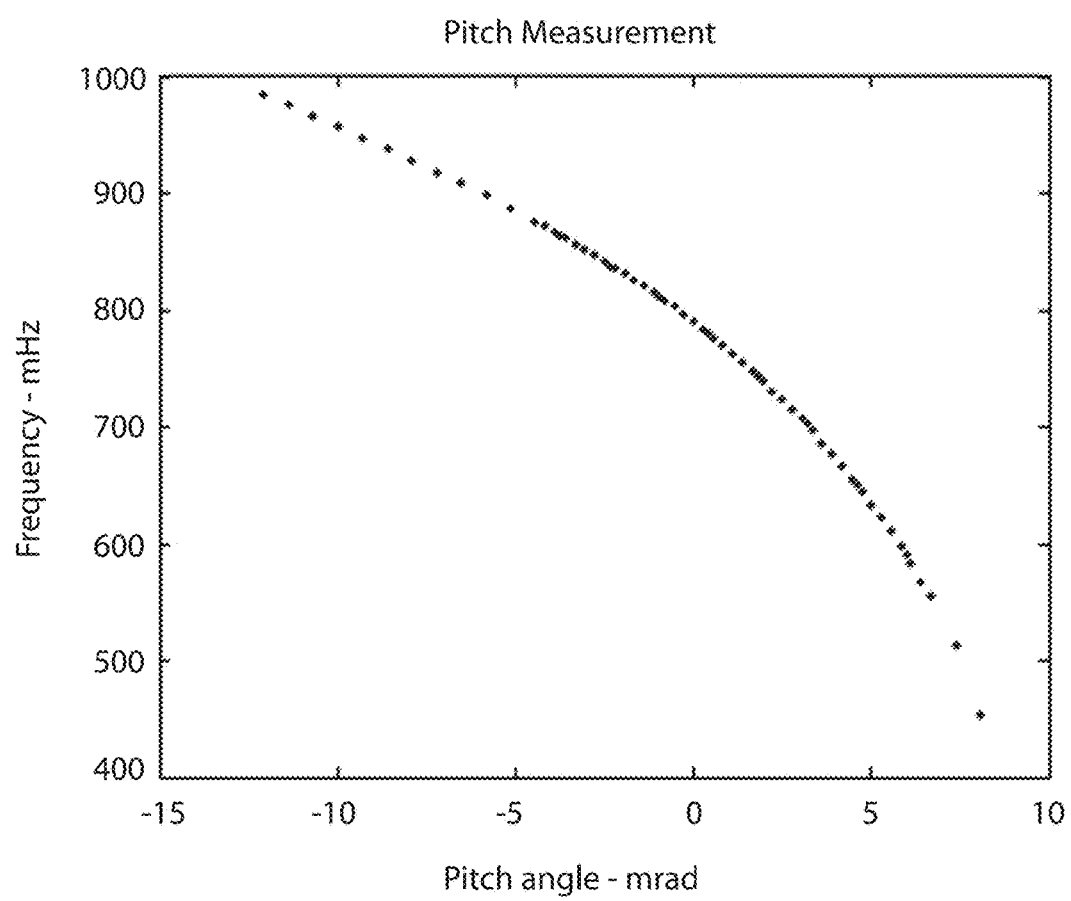
FIG. 8 shows the values of the measured natural resonance frequencies of the monolithic folded pendulum prototype, positioned in the reference system XYZ, in position $FP_1$ (as defined by $\gamma=0$), as a function of the pitch angle, $\beta$, for a null roll angle, $\alpha=0$. Such a figure demonstrates, in general, the validity of the utilized model and method, confirming, in particular, the correctness of the modeling of the equivalent gravitational elastic constant, $K_{g_{eq}}$, as expressed by equation (26) in the presence of the only pitch.

On the basis of the foregoing, it is clear that for each inclination angle the system oscillates at a frequency that is different depending on its orientation, as defined by the Tait-Bryan angles $\alpha,\beta$ (see experimental data in the FIGS. 7 and 8 which confirmed the variation beyond any usable theoretical model, since they have been obtained by experimental measurements).

It is important to stress at this point that the methodology proposed by the present invention is that of the measurement of the angular displacements by means of the measurement of the natural resonance frequency of the folded pendulum. Hence, for a correct application of such a methodology to the case of dynamic angular displacement, it is important that the condition is always satisfied wherein the upper limit of the frequency band of the angular displacements, $f_{lim}(\alpha, \beta)$, is always smaller than the value of the resonance frequency of the folded pendulum, in relation to the precision required to the measurement itself.

The methodology is fully valid also in the case of folded pendulums having finite quality factor Q. This is demonstrated by both the theoretical model at infinite Q that has been above described and the theoretical model providing for a finite Q, in the case of second-order systems such as the folded pendulum. An example of model for finite Q has been described in Acernese et al. [13]. In this model, a dissipative term is introduced, which widens the principle mechanical model illustrated in FIG. 1, making it depending on the realization mechanical scheme and the ambient conditions (for example the external pressure value).

By way of example, with the only aim of a better understanding of the expected effects on the behavior of a folded pendulum whose support is subjected to a generic angular displacement, $(\alpha,\beta)$, as referred to the ideal local horizontal plane, one considers two borderline cases, referring to the folded pendulum in the position $FP_1$:

a. Presence of the only roll ($\beta=0$), i.e. rotation of the folded pendulum around the only axis x;
b. Presence of the only pitch ($\alpha=0$), i.e. rotation of the folded pendulum around the only axis y.

It is here reaffirmed that the two opposite cases here described are given only by way of example and not by way of limitation. Indeed, in the example a. the value of the pitch angle, $\beta$, can be different from zero ($\beta \neq 0$), provided that it is constant and known, as in example b. the value of the roll angle, $\alpha$, can be different from zero ($\alpha \neq 0$) provided that it is constant and known. The frequency as a function of angles $\alpha$ and $\beta$, can be either theoretical or experimental as obtained by calibration of the folded pendulum.

In the a. case, the expression of the gravitational equivalent elastic constant, $K_{g_{eq}}$ (Equation (24)), reduces to a relatively simple function of a given by:

$$K_{g_{eq}}(\alpha) = \left\{(m_{p_1} - m_{p_2})\frac{l}{l_p^2} + (m_{c_1} - m_{c_2})\frac{1}{l_p}\right\} g \cos \alpha \quad (25)$$

In the a. case, the rotation occurs along an axis parallel to the motion of the central mass, so that the component of the gravitational acceleration, $g_y(\alpha,0)$, perpendicular to the motion of the central mass, is totally compensated by the constraint reaction of the joints, which, by definition, do not allow the central mass for any movement in this direction.

It is important to stress that in this case the dependency on the roll angle, $\alpha$, is an "even" function referred to the point of maximum (or minimum, because the gravitational equivalent elastic constant, $K_{g_{eq}}$, can also assume positive values) of the natural frequency of the folded pendulum that one has for $\alpha=0$. This justifies the trend of the theoretically function and the experimental measurements reported in FIG. 7, which confirm the trend of the resonance frequencies as a function of the inclination beyond any usable theoretical model.

Hence, in this case, given the non-bijectivity of the frequency function as a function of the roll angle, $\alpha$, the measurement of the resonance frequency would allow to obtain the only module of the roll angle, $|\alpha|$, but not the rotation direction ($|\alpha|=\alpha(f_0)$, inverse function of $f_o = f_o(\alpha,\beta)$ see the following sections of the present description; concerning $\beta$, one will have an inverse function $\beta=\beta(f_0)$ with the sign, owing to the fact that $f_0$ is bijective, and therefore invertible, for this angular variable). This problem can be easily overcome, by using known techniques, widely applied in scientific filed to this type of problem, which suggest a simple and effective solution for this specific application. It is here specified that, in order to obtain the functions $\beta=\beta(f_0)$ or $\alpha=\alpha(f_0)$ one has to know respectively (alternatively) the angles $\alpha=\alpha_{known}$ or $\beta=\beta_{known}$ equal to values known a priori (these angles can also be null).

Indeed, in a simplified model, the position of the folded pendulum in the reference system XYZ is defined by FIG. 2, so that a clockwise or anti-clockwise rotation in a (roll) of the reference system XYZ (and, therefore, of the folded pendulum) would be indistinguishable using the only measurement of the resonance frequency, since such a function is not bijective in a. On the other hand, the two branches, $\alpha>0$ and $\alpha<0$, of the frequency function as a function of the roll are mirror-like and each monotone, as clear both from theory and experimental measurements (FIG. 7). The problem is, therefore, solved in this case in a simple way by utilizing each time only one of the two branches, i.e. either $\alpha>0$ or $\alpha<0$. Both theoretically and experimentally, this can be obtained by positioning the folded pendulum at a known roll angle, $\alpha_o \neq 0$, (whose absolute value and rotation direction are both known). This angular positioning (angular offset), which does not modify, as stressed above, in no way the model and the description of the invention, is obtained experimentally by positioning the folded pendulum as rotated by the above-mentioned roll angle, $\alpha_o$, with respect to its own integral reference system, XYZ.

In such a way, in an interval of width $2\alpha_o$, the frequency function as a function of the roll angle is bijective and, therefore, invertible: the real value of angle $\alpha$ is obtained, therefore, in a simple and classical way by subtracting, to the measured roll angle value, the value of the offset roll angle, $\alpha_o$.

However, it is as much clear that the simple proposed solution is not the only possible one to obtain, further to the absolute value of a, the rotation direction as well. For example, two other ones among the possible solutions are described in the following. Such two solutions, however, require two measurements. The choice among the different possible solutions depends on the specific applications.

1. A first measurement is performer, deriving the module of the roll angle, $|\alpha_1|$. The folded pendulum is then rotated by a roll angle, $\alpha_o$ (with rotation known amount and direction), operation corresponding to a rotation of the reference system XYZ, and the new module of the roll angle, $|\alpha_2|$ is derived. The increase and/or decrease of the value of the measured roll angle and the knowledge of the absolute value and rotation direction of $\alpha_o$ allow to identify the branch of the involved function and, therefore, absolute value and direction of the roll angle $\alpha_1$.
2. Two folded pendulums are used, not necessarily identical, positioned in the reference system XYZ, one of the two is rotated by a known (in module and orientation) roll angle, $\alpha_o$, with respect to the same reference system XYZ (angular offset). The measurement of the resonance frequencies, and the knowledge of the progression of the resonance frequency function as a function of the roll angle, $\alpha$, allows to individuate the branch of the involved function and, therefore, absolute value and direction of the roll angle of each one of the folded pendulums.

In the b. case, the expression of the gravitational equivalent elastic constant, $K_{g_{eq}}$ (Equation (24)), reduces, instead, to a function of the only pitch angle, $\beta$, given by:

$$K_{g_{eq}}(\alpha, \beta) = \left\{ (m_{p_1} - m_{p_2}) \frac{l}{l_p^2} + \left[ (m_{c_1} - m_{c_2}) - 2 \frac{m_c}{l_d} \frac{M_{eq} g}{K_{e_{eq}}} \sin\beta \right] \frac{1}{l_p} \right\} g \cos\beta \quad (26)$$

In such a case, the component of the gravitational acceleration, $g_Y(0,\beta)$, perpendicular to the motion of the central mass, is null.

It is important to stress that in this case the dependency of the resonance frequency on the pitch angle, $\beta$, is a "monotone" function with respect to the horizontal orientation of the folded pendulum support. This justifies the trend of the theoretical function and the experimental measurements reported in FIG. 8, which, also in this case, confirm such variations beyond any usable theoretical model.

Any other orientation can be described by a generic angles pair, $(\alpha,\beta)$, for the folded pendulum in the position $FP_1$. In FIG. 6 the theoretical trend of the resonance frequency of a typical folded pendulum as a function of the roll angle, $\alpha$, and pitch angle, $\beta$, is shown.

Of course in the hypotheses of $\alpha=0$ and $\beta=0$ the new model reduces to and reproduces the classical model of the literature [20].

It is important to stress that a suitable choice of the parameters of the sensor can make it more or less sensible to the angular displacements of roll and/or pitch, and, therefore, allow an easier decoupling of the various degrees of freedom.

The foregoing holds also for a folded pendulum that is modeled by a different Lagrangian or for which a resonance frequency-angular position curve is provided.

Measurement of the Angular Position According to the Invention

The above explained methodology reduces, therefore, the measurement of an angular displacement (angular motion) to a measurement of the resonance frequency of the folded pendulum, $f_o = f_o(\alpha,\beta)$, a measurement that is relatively easier, realizable both analogically and digitally by any technique that is able to allow the carrying out of the measurement of the resonance frequency of the folded pendulum sensor.

Owing to the fact that, according to an aspect of the invention, the folded pendulum utilized in the description and in the experimental measurements has a highest Q, the output (measurement of the relative position of the central mass with respect to the support) is as a matter of fact very well approximated by a sinusoid varying its resonance frequency in relation to the orientation (angular displacement) of the support. Therefore, to the end of deriving such an information, it is necessary to determine in real time, in quasi-real-time or even off-line such a frequency by any analogical and/or numerical method allowing to obtain the requested precision. It is further clear that a better quality and rapidity in the measurement of the resonance frequency relevant to a certain angular displacement can be obtained, for example in the digital case (but not in a limiting way because it is possible to utilize also, and sometimes in a better way, analogical techniques), when the sampling frequency of the output signal is some orders of magnitude (more in general at least 5 or 10 times) larger than the natural resonance frequency and the variation of the angular displacement one wishes to measure.

It is further clear that according to the invention the oscillator properties of the folded pendulum are here at stake, since it is the resonance frequency that by means of the model of the invention is put into a relationship with the angular displacement, and not other quantities. Naturally, in order that this be possible, the folded pendulum must be subjected to any mechanical stress (artificial such as a mechanical excitation or stress or natural such as a microseism) which contains the resonance frequency to be measured. Therefore, in the present invention, one utilizes the oscillator properties of the folded pendulum.

Since the system can be designed with high Q, it is also clear that it can, in line of principle, be sufficient only for a small signal (angular or linear), such as for example a local micro-seism, in order to force the system to the oscillation, so that the output signal becomes as a matter of fact a sinusoid with high signal-to-noise ratio with respect to the other signals (because of the high Q of the sensor). Of course, one could find himself in the experimental condition wherein the experimental site in which one wishes to perform the measurements has a very low noise (microseism, for example) around the resonance frequency, that is not sufficient to naturally excite in a suitable way the folded pendulum to its resonance frequency, making it very difficult (and/or without suitable precision) to measure its natural oscillation frequency. In such a case, therefore, being the oscillation amplitude too low, it is necessary to apply artificially an external forcing to the oscillation so that the system is brought to oscillate at its own resonance frequency with suitable amplitude so as to allow the performing of the measurement of the natural resonance frequency of the folded pendulum with suitable precision. The absence of feedback loop is important, even if not limiting in line of principle, the system having to oscillate in a "free" manner, due to the fact that the resonance frequency must depend on the only mechanical characteristics of the sensor and the ambient wherein it is placed.

It is fully clear that in this new methodology one does not seek in any way to dampen the oscillation at the resonance frequency like in Takamori [5], but one tries by any means to excite this oscillation because the measurement of the folded pendulum resonance frequency (variable with the angular position) is exactly the key element for the measurement of the angular displacement in a way that is completely independent from the linear displacement, measurement that constitutes the innovative solution to the general problem of the decoupling of angular displacements from angular ones in the folded pendulum. In [5], one models a sensor resonance frequency as constant (equation (1) and equation (2)). Instead, it is exactly the dependency of the folded pendulum resonance frequency on the angular displacement, modeled and described in the present patent application, that allows to solve such long-standing problem.

The relative simplicity of such a measurement is shown by the fact that the folded pendulum is as a matter of a system of the second-order [11]. Indeed, by defining the coordinate of the support of the folded pendulum (fixed to ground) as $x_f$ and the coordinate of the central mass ($m_c$) as $x_c$, the transfer function (domain of the Laplace Transform) describing the displacement of the central mass with respect to the displacement of the ground is given by [11-13, 20-21]:

$$H(s) = \frac{X_c(s) - X_f(s)}{X_f(s)} = \frac{-(1-A_c)s^2}{s^2 + \frac{\omega_o}{Q(\omega_o)}s + \omega_o^2} \quad (27)$$

wherein $Q(\omega_o)$ is the global mechanical quality factor and:

$$A_c = \frac{\left(\frac{l_p}{3l} - \frac{1}{2}\right)(m_{p_1} - m_{p_2})}{M_{eq}} \quad (28)$$

is the parameter correlated to the effects of the center of percussion [21]. The equation (27) can, therefore, be rewritten in the domain of the Fourier transform as:

$$H(\omega) = \frac{X_c(\omega) - X_f(\omega)}{X_f(\omega)} = \frac{(1-A_c)\omega^2}{-\omega^2 + \frac{\omega_o}{Q(\omega_o)}j\omega + \omega_o^2} \quad (29)$$

The general dependency of $Q(\omega_o)$ on the angular resonance frequency, $\omega_o$, has been experimentally demonstrated and discussed in [11-13].

It is, therefore, clear from the (29) that in order to measure the folded pendulum resonance frequency any technique can be utilized. Of course the technical choice and its application reflect on the measurement precision of the resonance frequency, $f_o = f_o(\alpha, \beta)$, and, therefore, on the final precision of the measurement of the angular position of the folded pendulum by $(\alpha, \beta)$.

Therefore, the optimum application of this technique requires that the folded pendulum be placed in oscillation at its resonance frequency and that this oscillation have a high signal-to-noise ratio with respect to the other frequencies that are in the measured spectrum (and therefore a suitable value of the quality factor) to the end of measuring its value with suitable accuracy.

It is important to stress that many experimental realizations of folded pendulums, such as those reported for example in [11-13], show an experimental behavior that is very close to the theoretical one described by the equation (29), highlighting the possibility to obtain, with relative easiness, quality factors well larger than 1000 in the air and well larger than 10000 in the medium vacuum.

High quality factor values make the natural resonance frequency of the folded pendulum well-defined and stable, characteristic that translates in the Fourier transform domain as a narrow peak centre centered on the system resonance frequency, that is by the way very well modeled by the equation (29), characterized by a high signal-to-noise ratio with respect to the other frequencies that are in the spectrum. For example, in the presence of very high quality factors, the natural resonance frequency of the folded pendulum can be calculated with relative easiness from the estimate of the value of the frequency at which one has a maximum of the power spectral density of the output signal acquired by the reading system, evaluated for example by the Fast Fourier Transform in the neighborhood of the system resonance frequencies [22]. In the time domain, instead, a high value of the quality factor makes the oscillation of the system at its resonance frequency much more evident and definite with respect to other possibly present, making possible the utilization of methods, that are fast and effective even in real time, such as for example methods based on the trigonometric regression and on instrument calibration curves, measured beforehand, that tie the trend of the resonance frequency to the angular displacement [23].

Since, therefore, the primary objective for the validation of the described methodology, and, therefore, the realization of an angular position sensor based on the folded pendulum, is the extraction of the instantaneous resonance frequency, tied to the value of the Tait-Bryan angles $(\alpha, \beta)$, it is clear, based on the foregoing, that the value of the quality factor of the folded pendulum is tied to the precision level of the measurement of the resonance frequency and, therefore, of such angles. Hence, it becomes important, for example, already in the step of mechanical design of the folded pendulum (including the step of choosing of the materials), the definition of specifications on the quality factor, in relation to the accuracy level desired in the determination of the angular displacement. Such a mechanical design must take into account also the ambient conditions wherein the pendulum works, conditions that can strongly affect the value of the quality factor, among which the contribution of the air viscous friction. For example, the only introduction of a folded pendulum into a vacuum system allows to largely improve the mechanical factor, owing to the fact that the effects of viscous friction, due to the presence of the air, are reduced in relation to the realized vacuum level, as by the way already largely demonstrated in [11-13].

The quality factor in air preferred for each folded pendulum of the present invention is larger than 1, in particular larger than 100, more in particular larger than 1000.

It is stressed that the described model is fully valid for an ideal folded pendulum, i.e. in the absence of viscous friction effects, that can be of internal nature (for example mechanical dissipation in the joints) or external (for example friction with air by the central mass and the arms of the pendulums). It is however as much clear from the existing literature, and in particular that wherein the present inventors are authors and is cited in the bibliography, that realization of folded pendulums, in particular monolithic folded pendulums, have been effected which are working in high vacuum as well, with values of quality factor of the folded pendulum that there are sufficiently high to consider the described theoretically model as suitable for a correct description of the experimental results and performances of the tool.

It is also as much experimentally clear that a real instrument is usually accompanied by a sheet describing its performances and calibration, to the end of increasing the accuracy in the measurements and compensate for effects due to small differences in the realization of the pendulum at different ambient conditions.

A different discussion must be made in the case wherein it is not technically possible to neglect the effects due to the viscous dampings, such as for example those above-mentioned for which the quality factor is not so high to make such effects negligible.

Even in this case, the model describing the system in terms of transfer function has been developed by the inventors and is present in the literature (see for example paper 11 of the bibliography). On the other hand, however, being the folded pendulum a system of the second order, the presence of a term of viscous fiction (due to the effects of internal and external friction) has, as an effect, important to the aims of the present methodology, that of modifying the value of the natural resonance frequency of the folded pendulum, always keeping the dependency of the same frequency from the inclination angle of the support, even if with corrective factors.

Indeed, as it is well known in the literature, for a second-order system in the presence of viscous fiction (globally described by the quality factor, Q) the real resonance frequency with respect to the ideal one $f_0$ is tied by the relationship:

$$f_r = f_0 \cdot \sqrt{1-d^2} \quad (30)$$

with $d=1/(2Q)$.

Therefore, the effect of the viscous friction is to produce a decrease of the value of the sensor resonance frequency, by the way fully predictable on the basis of the above-mentioned theoretical function of the only natural resonance frequency, $f_0$, and the quality factor of the pendulum, Q.

Even in this case, but in much more important way, although a correct prediction of the instrument performances by the theoretically model is possible, also the calibration of the same instrument can be very useful, to the end of increasing the accuracy of the measurements and compensating for the effects due to small differences in the realization of the pendulum and different ambient conditions. Of course the numerical derivation of the resonance frequency as a function of the inclination angle, starting from a system numerical Lagrangian is a solution that is always possible and effective.

To summarize, the above described innovative modeling relate the orientation (angular displacement) of the folded pendulum, as described by the Tait-Bryan angles for the rotations sequence YXZ (pitch-roll-yaw), with respect to the reference system, xyz, with its natural resonance frequency, quantifying it in the equation (23), with equivalent elastic constant expressed by the equation (4) and gravitation equivalent elastic constant expressed by the equation (24), in the framework of the assumptions wherein such relationships have been analytically derived.

However, not only the modeling but also and above all the solution of the inverse problem is relevant for the application aims: starting from the knowledge of the folded pendulum resonance frequency, deriving the angles of Tait-Bryan $\alpha$ (roll) and $\beta$ (pitch), that describe conveniently the orientation of the folded pendulum with respect to the local horizontal (plane perpendicular to the gravity acceleration vector).

This is, for example, the case (and solution) of all those problems of precision aligning, wherein it is important to know with high precision the Tait-Bryan angles to the end of orienting, with the precision required by the specifications, the reference plane (XY in the folded pendulum reference system), plane whereon the support of the folded pendulum is fixed, so that it is positioned horizontally or according to a predefined pair of angles $(\alpha, \beta)$.

It is also clear, and it is here stressed, that in the description of such an invention an analytical representation of the model has been used, which is valid only in the framework of the made approximations. It is, however, clear that, on the basis of the above described approach, it is always possible to derive more general Lagrangian models, removing part or all the made approximations. It is, however, as much clear that more complex Lagrangian models requires almost certainly numerical type solutions, specific representation of single cases, which cannot be represented in a general way like in the foregoing, wherein it was necessary to do so for a general description of the model and the invention.

On the other hand, even a both analytical and numerical representation provides a rough indication of the behavior and performances of the single folded pendulum. Indeed, all the measurement instruments that are used in the industrial, civil and scientific field are always provided with a calibration curve of the same instrument. In such a specific case, the calibration curve must express the trend of the resonance frequency as a function of roll angle $(\alpha)$ and pitch angle $(\beta)$, constituting reference for the solution of the above inverse problem, even in the presence of analytical solutions and formulations.

The method of the measurement of the variation of the folded pendulum resonance frequency introduced in the present invention allows applications in different fields and forms. In the following, we will indicate two possible applications that are not exhaustive i.e.:

1. horizontal positioning of a generic plane by using the folded pendulum;
2. measurement of the orientation (angular position) of a generic plane with respect to the horizontal by using two folded pendulums.

Application 1.

It is the object of this technique to orient horizontally a generic plane XY, i.e. making it superpose to the reference plane (xy) of the fixed reference system (xyz). A simple and direct technique that guarantees the achievement of the objective is to fix the folded pendulum to the plane XY, defining the axes so that the same pendulum is in the position $FP_1$. At this point, the process to be followed is easily recognizable by analyzing the expression of the gravitational equivalent elastic constant, $K_{g_{eq}}$ [equation (24)] and, more in particular, equation (25). Indeed, these relationships show that the gravitational equivalent elastic constant is an even function of the roll angle, $\alpha$, in the neighborhoods of the angle $\alpha=0$ (rotation around the axis X). Accordingly, also the natural resonance frequency of the folded pendulum, as expressed by equation (23), is an even function in the neighborhoods of $\alpha=0$, wherein it assumes maximum or minimum value for $K_{g_{eq}}$ positive or negative, respectively. The foregoing, besides being theoretical modeled, is experimentally demonstrated by the results presented in FIG. 7.

On the basis of these considerations, one can conclude that, in order to position the Y axis horizontally (therefore lying on the plane xy of the fixed reference system xyz), it is sufficient to rotate the folded pendulum (and, accordingly the reference plane XY to which it is fixed), around the axis individuated by the movement direction of the central mass till the measured natural resonance frequency achieves a maximum value (or minimum value depending on the physical and geometrical characteristics of the single folded pendulum, as defined in the design stage). Once such a frequency has been individuated and once the folded pendulum has been positioned in such a way to maintain this situation, one is certain that the Y axis of the reference system XYZ is positioned horizontally, lying in the plane (xy) of the fixed reference system (xyz).

At this point it is necessary to proceed with a new rotation of the folded pendulum (and therefore of the XY plane) this time around the Y axis (pitch), so as to position horizontally the X axis as well. Differently from the previous rotation, however, in this case it is not possible to use any symmetry condition, the natural resonance frequency being a monotone function of the rotation angle of the folded pendulum around the Y axis. This problem is solved in the relatively simple way, utilizing the (resonance frequency-angular position) calibration curves of the same sensor. One proceeds, therefore, by seeking the natural resonance frequency (obtained by the calibration curves of the folded pendulum) that corresponds to the horizontal orientation of the folded pendulum. According to an aspect of the invention, one has a method for the orientation of a plane on the local horizontal, i.e. on the plane perpendicular to the gravity force or the force of an equivalent conservative field, wherein an only folded pendulum or a first and a second folded pendulum is used. Each of said an only folded pendulum, a first and a second folded pendulum comprises a support F with a base, a test mass PM with an oscillation direction, a simple pendulum arm SP and an inverted pendulum arm IP that connect the test mass PM to the support F, the folded pendulum being positioned in such a way that said oscillation direction is along the X-axis of a reference system XYZ obtained by rotation from a reference system xyz, wherein the z-axis is along the direction of the gravity field or an equivalent conservative field, by the Tait-Bryan angles of roll $\alpha$, $\beta$ and yaw $\gamma$, or another equivalent angular rotations description, said first and second folded pendulum being positioned in such a way that said oscillation direction is along the X-axis for the first folded pendulum and along the Y-axis for the second folded pendulum, wherein, in the case of an only folded pendulum, the following steps are executed:

MO1. Providing a resonance frequency-angular position calibration curve or a curve obtained by theoretical modeling of said folded pendulum (for example starting from a Lagrangian $\Lambda$ describing the folded pendulum;

Rotating said XY plane around the X-axis by varying the roll angle $\alpha$, and concurrently measuring the resonance frequency of the folded pendulum, till the a maximum or a minimum of the measured resonance frequency is identified, the XY plane being eventually rotated around the X-axis so that by construction $\alpha$=0;

MO3. Keeping the position of planeXY around the X-axis as assumed at the end of step MO2, rotating said XY plane by varying the angle $\beta$, and concurrently measuring the resonance frequency of the folded pendulum, till a value equal of the measured resonance frequency to the one corresponding to $\beta$=0 in the calibration curve or the curve obtained by theoretical modeling is identified;

whilst in the case of first and second folded pendulum only step MO2 is executed for the first and second folded pendulum respectively subsequently rotating plane XY around X-axis (roll movement of the first folded pendulum corresponding, therefore, to variations of $\alpha$), and the second folded pendulum around the Y-axis (roll movement of the second folded pendulum corresponding, therefore, to variations of $\beta$).

This is possible because the function $f(\alpha,\beta)$ of the first pendulum is even for rotations of the X axis, whilst the second pendulum is even around the Y axis, the latter being rotated by $\gamma=\pi/2$.

The rotations of the present description may be performer by known motors/actuators in a known way.

The method for finding a maximum or minimum is known in the literature, and normally consists in going beyond such maximum or minimum and then coming back and so on till one is positioned on such maximum or minimum with the desired accuracy.

A verification of the goodness of the orientation, but also a search for the orientation of the same plane XY, can be made both repeating the process anew (for a fine orientation) and by a different method. With one or more pendulums positioned in such a way that the direction of oscillation of their test mass lies on or is parallel to the XY plane, and the oscillation directions are not parallel to each other, one makes the reference system XYZ rotate, the reference system XYZ being integral to the support of the folded pendulum, around the Z axis, measuring the natural resonance frequency value for various yaw angles $\gamma$. It is, indeed, clear that, being the orientation of the XY plane independent from the yaw angle $\gamma$, for the chosen Tait-Bryan sequence of angular rotations (pitch-roll-yaw), if the XY plane is perfectly horizontal, no significant frequency variation needs to be measured, for any yaw angle $\gamma$. The following steps are then executed:

NO1. rotating said XY plane around X e Y axes by arbitrary quantities;

NO2. rotating said XY plane around the Z-axis, and measuring the resonance frequencies of said one or more folded pendulums by respective measuring systems;

repeating the steps NO1 and NO2 till the variation of resonance frequencies measured in step NO2 is below a pre-determined threshold corresponding to a noise level of the respective measuring systems. The movements of the plane around the three axes can be recorded (stored) and by this the starting position of the plan is determined by combining such movements to find said orientation of the plan, using the fact that in the horizontal position $\alpha$ and $\beta$ are virtually null.

For example, in the simplified case of the method that uses a single pendulum folded and wherein $\beta$=0, said roll angle $\alpha$ (initial position of the XY plane to be determined) and being $\Delta\alpha_i=\alpha_i-\alpha$, the i-th angular variation applied (positive and/or negative), and then known (and recorded), with $\alpha_i$ new angular position determined from the i-th rotation, ones builds up a table that correlates $\Delta\alpha_i$ with the resonance frequency, $f_o$, of the pendulum folded. A sufficient number of measurements allows to evaluate the trend (curve) of the resonance frequency and identify the corresponding i-th rotation. Since, based on the characteristics of the folded pendulum (FIG. 7), its maximum (or minimum) corresponds to $\alpha_i$=0, then $\Delta\alpha_i$=−$\alpha$, wherefrom the initial roll anode of the XY plane, $\alpha$, is derived. A similar calculation can be done with incremental quantities $\Delta\alpha_i$ (instead of starting from the initial position, one starts every time from the i-th position), which are added together, and being known, $\alpha$ is still obtained. In the more general case in which also $\beta$ varies, one will use the fact that this is also approximately zero when the resonance frequency measured in the step NO2 is below a predetermined threshold, to perform the calculation of the initial position. In the case in which the method is carried out with only one pendulum, this will conveniently be oriented along the X axis.

One can also program the successive rotations as a function of the previous rotations so as to heuristically search for the final position, with a feedback system in a known manner. This application may (but need not) require a preliminary calibration of the pendulum folded, which shows the trend of the resonance frequency of the sensor as a function of the roll angle, $\alpha$, and pitch, $\beta$ (or a curve of this type derived by theoretical models).

The choice of the rotation sequence YXZ allows to use the symmetry of the trend of the sensor resonance frequency as a function of the roll angle, $\alpha$, in the neighborhoods of the position $\alpha=0$ allowing to position the sensor in $\alpha=0$ independently from the current value of the pitch angle, $\beta$, simply by seeking the minimum (or the maximum) of the resonance frequency, making rotate the XY plane, to which the folded pendulum is integral, around the x axis (roll). The final horizontal positioning of the XY plane is completed by rotation around the Y axis (pitch) to position it in $\beta=0$. This second positioning requires necessarily, however, the knowledge of the analytical and/or calibration curve of the folded pendulum. The advantage of this solution is evident: for the horizontal positioning of the XY plane it is not necessary any longer the complete knowledge of the trend of the function $f_o=f_o(\alpha,\beta)$, but it is sufficient the knowledge of the only curve $f_o=(0,\beta)$, that is easier to derive. By the way, this typology of application makes understand also one of the advantages of the choice of the Tait-Bryan rotation sequence YXZ, utilized in the description of the angular sensor.

It is possible, both in line of principle and in the practice, to position horizontally the XY plane by means of a sequence (although much more complex than the described one) of arbitrary rotations around X, Y axes, verifying each time that the rotation around the z axis does not vary the resonance frequency, without using calibration curves for the folded pendulum, but only its geometrical and symmetry properties.

Application 2.

The measurement of the angular position (orientation) of a generic plane with respect to a horizontal plane, that can be expressed by the Tait-Bryan pair ($\alpha,\beta$), can be effected in a univocal way by using at least two folded pendulums fixed to it and positioned on such a plane with a different orientation. A possible disposition, optimized to this end, but not necessary (in general, a non-vanishing angular distance between the oscillation directions of the two pendulums will suffice), is to orient them orthogonally to each other, with the directions of motion of the respective central masses that are parallel to the XY plane.

In this configuration, one positions the first in the position $FP_1$ ($\gamma=0$). The dynamic behavior of this pendulum has been widely described in the previous section. In particular, its natural resonance frequency, $f_o$, is expressed by the equation (23), with the equivalent elastic constant $K_{e_{eq}}$, described by equation (4), but with equivalent gravitational elastic constant $K_{g_{eq}}$, that is function of the roll angle, a and the pitch angle, $\beta$, described by the equation (24).

The second folded pendulum, it also fixed to the XY plane, is oriented orthogonally to the first one. The position is obtained by positioning the folded pendulum in the position $FP_1$ and performing a rotation of the Z axis equal to $\pi/2$ in the anticlockwise direction, corresponding to a yaw angle equal to $\gamma=\pi/2$. Let's define these positioning as "$FP_2$ position".

It is clear that, because of the different orientation, the effects of the gravity acceleration on this seconds folded pendulum are different from those on the first folded pendulum.

It is further important to stress that this application allows to verify some advantages of the choice of the particular representation of the reference system (XYZ) with respect to the fixed reference system (xyz) as a function of the Tait-Bryan angles ($\alpha,\beta,\gamma$) with pitch-roll-yaw sequence.

Indeed, it is stressed here that the positioning of this second pendulum differs from the positioning of the first only by a rotation in the anticlockwise direction of $\pi/2$ around the Z axis. Indeed, the angular position of the reference integral to the first folded pendulum is described by a yaw angle equal to $\gamma=0$, whereas the angular position of the reference integral to the second folded pendulum is described by a yaw angle equal to $\gamma=\pi/2$. This means that the roll and pitch angles, as defined, i.e. relevant to the inclination of XY plane with respect to xy plane, are identical for both folded pendulums, characteristics that constitutes the fundamental element for the solution of this problem.

The different positioning of the second folded pendulum entails, however, also a different action of the components of the gravity acceleration vector, $\vec{g}$, with respect to the first one.

Indeed, the components of the gravitational acceleration vector, $\vec{g}$, in the reference system integral to the folded pendulum, XYZ, as described in terms of Tait-Bryan angles $\alpha,\beta,\gamma$, expressed in a vectorial form by the equation (13), become, for a yaw angle $\gamma=\pi/2$, the following:

$$g_{XYZ} = -\begin{pmatrix} \sin\alpha\cos\beta \\ \sin\beta \\ \cos\alpha\cos\beta \end{pmatrix} g \qquad (13\text{-}2)$$

Let's analyze the effect of the single components of the gravity acceleration along the directions of the reference system XYZ relevant to the second folded pendulum (we recall here that it is rotated by $\pi/2$ with respect to the first one) on its dynamic behavior:

a. the component of the gravitational acceleration along the X axis, $g_X(\alpha)$, $$g_X(\alpha) = -g\sin\alpha\cos\beta \qquad (13\text{-}2a)$$

acts along the direction of motion of the central mass, constituting, as a matter of fact, a forcing of the central mass in the direction of its motion, acceleration that will generate a force to which the (elastic) joints constraint reactions will be opposed.

b. The component of the gravitational acceleration along the Y axis, $g_Y(\alpha,\beta)$, $$g_Y(\alpha,\beta) = -g\sin\beta \qquad (13\text{-}2b)$$

acts along the direction perpendicular to the motion of the central mass, constituting, as a matter of fact, a transverse forcing of the joints, totally compensated by the same joints which, by reacting as ideal constraints in this direction, hinder any motion of the central mass in the direction perpendicular to the one that is theoretically expected.

c. The component of the gravitational acceleration along the Z axis, $g_Z$, effective component of gravitational acceleration, identical to that of the folded pendulum placed in "$FP_1$ position" is always expressed by the equation (13-1c).

By repeating the same process, executed up to now for the folded pendulum $FP_1$, also for the folded pendulum $FP_2$, one easily demonstrates that the natural resonance frequency, $f_o$, is always expressed by the equation (23) with the equivalent elastic constant, $K_{e_{eq}}$, always described by the equation (4), but with gravitational equivalent elastic constant, $K_{g_{eq}}$, that this function of the roll angle, $\alpha$, and pitch angle, $\beta$, this time expressed by:

$$K_{g_{eq}}(\alpha, \beta) = \tag{31}$$
$$\left\{ (m_{p_1} - m_{p_2}) \frac{l}{l_p^2} + \left[ (m_{c_1} - m_{c_2}) + 2 \frac{m_c}{l_d} \frac{M_{eq}g}{K_{e_{eq}}} \sin\alpha \cos\beta \right] \frac{1}{l_p} \right\}$$
$$g \cos\alpha \cos\beta$$

Summarizing, each one of the two pendulums oscillates at a natural resonance frequency globally expressed by the equation (23) with equivalent elastic constants expressed for both ones by the equation (4).

The expression of the gravitational equivalent elastic constant, $K_{g_{eq}}$, differs, however, for the two folded pendulums because of the different relative orientation quantified by the equation (24) for the folded pendulum in the position $FP_1$ and by the independent equation (31) for the folded pendulum in the position $FP_2$.

It is important to stress again that equations (24) and (31) are functions of the same roll, $\alpha$, and pitch, $\beta$, angles as referred to the position of $FP_1$, i.e. relevant to the inclination of the plane XY with respect to plane xy.

Indeed, the Tait-Bryan angular sequence utilized for the description of the present invention (roll-pitch-yaw) has been applied to position the second folded pendulum in the position $FP_2$, as referred to the position $FP_1$. To this end, an only rotation in $\gamma$ (yaw) equal to $\gamma=\pi/2$ has been performed. hence, by construction, angles $\alpha$ and $\beta$, in equations (24) and (31), are the same, as referred to the reference system XYZ.

Consequently, the two functions describing the resonance frequency of the folded pendulum, that for the folded pendulum $FP_1$ is expressed by equations (23), (4) and (24) and that for pendulum $FP_2$ is expressed instead by equations (23), (4) and (31), constitute a system of two independent equations characterized by four unknown quantities: the pair of angles ($\alpha$, $\beta$) and the two resonance frequencies, $f_o$, of the folded pendulums $FP_1$ and $FP_2$. The measurement of the resonance frequencies of the two pendulums allows to derive, in a univocal way, the pair of angles $\alpha$ and $\beta$, which quantifies the angular position of the plane XY with respect to plane xy. Of course, this methodology can be applied also numerically or by calibration curves.

To this example, the above disclosure about the offset non-vanishing and known roll angle can be applied, to one or both (or to all) pendulums (by solving the system $f_o^1=f_o^1(\alpha+\alpha_{o_1}, \beta)$ and $f_o^2=f_o^2(\alpha+\alpha_{o_2}, \beta)$), in such a way to be sure of having a univocal solution of the above equations system. The two equations of the system are now both invertible and therefore the system can be solved as system of two equations in two unknown quantities. The system of equations can be solved graphically by using the calibration curves or even the numerical values of the functions $f_o^1=f_o^1(\alpha+\alpha_{o_1}, \beta)$ e $f_o^2=f_o^2(\alpha+\alpha_{o_2}, \beta)$, or by using the analytical functions in the case they have been derived from Lagrangians (and here also one can use a numerical method). Such a system is solved by classical solution methods for equations system, even numerically or graphically.

It is important to stress that the choice of positioning the second folded pendulum, $FP_2$, orthogonally to the folded pendulum, $FP_1$, by a rotation equal to $\gamma=\pi/2$ of the reference system XYZ, certainly optimizes the measurement. Nothing impedes, however, to position the second folded pendulum, $FP_2$, by any rotation, $\gamma$ (obviously different from zero), as it could be suggested by purely experimental needs. By repeating the procedure followed in the case of yaw angle equal to $\gamma=\pi/2=\pi/2$, it is possible to obtain directly the analytical expression for the resonance frequency of $FP_2$.

Concerning, finally, the inversion problems, relevant to the evenness of the frequency function as a function of the roll angle, $\alpha$, for the $FP_1$ configuration, clearly the same previously indicated considerations hold and the same previously indicated solutions can be adopted.

It is not necessary that the two pendulums are identical, because their physical and geometrical characteristics are duly taken into account by the equations (23), (24) and (31). Moreover, it is important to stress that, although only two folded pendulums are sufficient for this type of determination, it is clear that in some cases it would be preferable to increase the number of folded pendulums, even with different orientation (different yaw angles $\gamma$) with respect to the proposed one, of course evaluating, with a process analogous to the shown one, the effects of the gravitational acceleration as a function of the positioning of the single folded pendulum, and solving an over-determined equation system, methodology that could be particularly useful to minimize the effects of external noise, increasing the sensitivity of the measurement.

One reaffirms here that the two cases presented to demonstrate the breadth of the application fields of the introduced innovative methodology and therefore of the invention, are only two possible non-exhaustive applications of the methodology of extraction of the formation on the orientation (angular displacements) of the folded pendulum by means of measurement of its resonance frequency.

For example, it is possible to proceed to the positioning of the XY plane by means of one or more folded pendulums even in the absence of calibration curves or a theoretical modeling. In fact, in this case one would use a fundamental property of the folded pendulum, by the way described in the theoretical model of the invention: if the oscillation direction of the central mass is parallel to the XY plane (integral with the pendulum folded) and the XY plane is, in turn, perfectly horizontal, a rotation of any amount around the reference axis Z (yaw $\gamma$) does not cause any change in the natural resonance frequency of the same folded pendulum. This property suggests that the horizontally of the XY plane can be sought and obtained in a wholly experimental way, even in the total absence of calibration curves of the instrument, by varying, for example, alternately and by small incremental amounts, $\Delta\alpha$ and $\Delta\beta$, the angles of pitch and roll up to reach full horizontally of XY plane, what can be demonstrated by the constancy of the resonance frequency of the folded pendulums to arbitrary rotations, $\Delta\gamma$.

It is also clear that a recordation (storing) of all the angular variations made in the research process of horizontally of the XY plane (for example, for the incremental method described above), allows by construction and with analytical procedure, the reconstruction of the initial position of the XY plane with respect to the xy plane. This latter consideration is of course valid, more generally, for any method used for the horizontal positioning of an XY plane, or simply to measure in a "destructive" (because for the performing of the measurement it is necessary to change the angular position of plane whose angular position is to be known). In fact, regardless of the used methodology, it is always possible, by means of inverse procedure, to analytically reconstruct the initial positioning of the XY plane, by carrying out, therefore, an indirect measurement, even in the absence of calibration curves or theoretical models, of the initial position by measurement and composition of angular displacements necessary for the horizontal positioning of the XY plane.

Separation of the Linear and Angular Components of the Motion of the Folded Pendulum It is, finally, very important to stress that the folded pendulum described is as a matter of fact a normal folded pendulum [11-13], whose output signal is a function of the linear displacement of the central mass with respect to the support fixed to the ground [11-13, 20-21]. Hence, the method according to the invention can utilize, without any loss of generally, the same traditional reading system of the folded pendulum. The difference is given by the different processing of the output signal. Indeed, whereas in the folded pendulum utilized as linear displacement sensor [4-13, 20-21] the output signal is the signal parallel to the ground and, therefore, the whole signal is of interest for the whole useful band, in the folded pendulum utilized as angular displacement sensor, the knowledge of the transfer function of the sensor (whose characteristic peak is the $f_o$, which varies with the angular position) is instead fundamental. This transfer function can itself be obtained theoretically by the Lagrangian models or experimentally at the calibration stage as a function of the angular position $(\alpha,\beta)$. This part (transfer function) is eliminated by the linear displacement signal, because the latter is corrected by dividing the output signal by the transfer function [11-13], so that the two linear and angular displacements are as a matter of fact independent signals.

This means that a folded pendulum, configured as a linear displacement sensor can be utilized (in line of principle) at the same time as angular displacement sensor.

This technique allows to derive in an exact way, in line of principle, the orientation (angular displacement) and, therefore, geometrically combining the two (or more) folded pendulums fixed to the measurement plane, utilized to measure the angular displacement of the plane, also the projection, along the axes of the reference system, of a generic linear displacement, method that is also the subject-matter of the present invention.

In particular, concerning the angular displacement signal, in the assumption to use folded pendulums positioned analogously to what has been described for $FP_1$ and $FP_2$, the output signal is processed (including also all the filtering operations previously described to maximize the signal-to-noise ratio) to the end of obtaining the resonance frequency. Subsequently, by using the methodology described in the previous section, solving the system (23, 4, 24) and (23, 4, 31) the angle pair $(\alpha,\beta)$, roll and pitch, is derived, which describes the orientation of the plane (XY) with respect to the horizontal reference plane (xy).

Concurrently, the same output signal is normally processed to obtain the linear displacement signal of the central mass relatively to the current direction of the plane whereon the folded pendulums are placed, by following the scheme adopted in all the effected realizations made as yet, which provides that the signal is multiplied by the inverse of the transfer function of the folded pendulum and, subsequently, derived twice in order to obtain the linear acceleration [11-13].

It is clear from the foregoing that the two sensors, being positioned orthogonally with respect to each other (along the axes X and Y) and fixed on the plane XY, allow to measure the only projection on the plane XY of a generic linear displacement of any direction in the fixed reference system xyz. They do not allow in any way to reconstruct completely the arrival signal in terms of direction and amplitude in the fixed reference xyz.

This can be solved for example by adding a third sensor, orthogonal to the two others, positioned with the direction of motion of the central mass along the direction of the Z axis (for example a vertical folded pendulum [10]). With this configuration, any input signal that can be represented vectorially in the reference system xyz can be projected along the directions of the reference system XYZ integral to the folded pendulums, by classical and well-known projection techniques utilizing the Tait-Bryan $(\alpha,\beta,\gamma)$ angles tying the reference system integral to XYZ plane to the fixed reference system xyz.

The knowledge of the values of the projections along direction XYZ of the signal of linear displacement, as it is measured by the folded pendulums, allows, hence, certainly to reconstruct the original starting from the knowledge of the Tait-Bryan angles by classical inversion techniques.

It is important, however, to stress that other configurations are possible, even redundant, to the end of minimizing the effect of the external noises, guaranteeing a better quality of the measurements themselves.

This method for the measurement of the angular position and the linear displacement of a reference system XYZ with respect to a reference system xyz wherein the z-axis is along the direction of the gravitational field, the reference system XYZ being obtained by rotation of the system xyz by means of the Tait-Bryan angles of roll $\alpha$, pitch $\beta$ and yaw $\gamma$, or another equivalent angular rotations description, may comprise executing the following steps:

ML1. Providing a first folded pendulum, which is fixed to the reference system XYZ on the plane XY in such a way that the oscillation direction of its test mass lies on or is parallel to the XY plane, and has a known offset roll angle $\alpha_{o_1} \neq 0$ with respect to the XY plane;

ML2. Providing a second folded pendulum, which is fixed to the reference system XYZ on the plane XY in such a way that the oscillation direction of its test mass lies or is parallel to the XY plane, at a non-null angular distance from the oscillation direction of the test mass of the first pendulum, and has a known offset roll angle $\alpha_{o_1} \neq 0$ with respect to the XY plane;

ML3. Providing a third folded pendulum and fixed to the reference system XYZ on the plane XY in such a way that the direction of its test mass lies or is parallel to the Z-axis; wherein the first, second and third folded pendulum each comprise a support (F) with a base, a test mass (PM) with an oscillation direction, a simple pendulum arm (SP) and an inverted pendulum arm (IP) that connect the test mass (PM) to the support (F); and the following steps are further executed:

ML4. Measuring the linear displacements of the test masses of the first, second and third folded pendulum;

ML5. Measuring the angles $\alpha$ and $\beta$, using the first and second folded pendulum by means of one or more methods disclosed herein;

ML6. Projecting the plane XY onto the plane xy;

ML7. Measuring the angle between the projected X or Y axis and the x or y-axis respectively, said angle coinciding by construction with the angle γ;

ML8. Projecting the linear displacements measured in step ML4 into the reference system xyz by means of the Tait-Bryan angles α, β, γ as measured in steps ML5 and ML7.

In step ML7, the angle γ can be measured by making the plane rotate till projected axes X and Y coincide with axes x and y.

Experimental Realization of the Invention

The basic scheme of the folded pendulum utilized for the realization of the prototype of sensor of angular position (angular motion) is based on the classical architecture of a horizontal folded pendulum, as described in the literature [1-13], constituted substantially by a simple pendulum, an inverse pendulum and a bar joining the oscillating ends of such pendulums (FIG. 4)[9].

Figure 4:
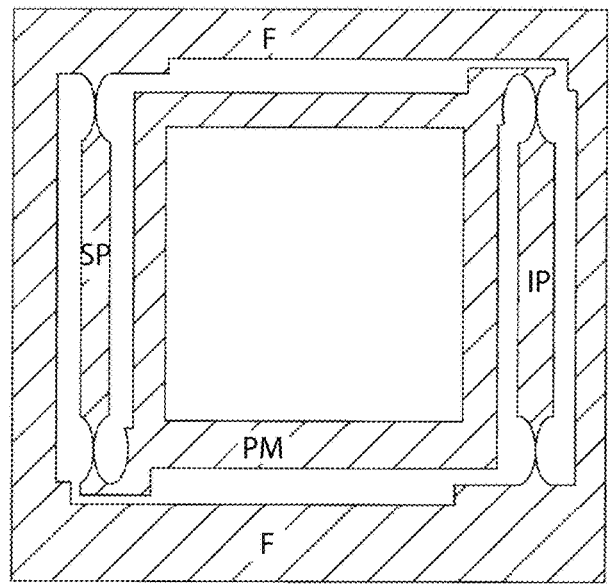
FIG. 4 shows the realization scheme, in a lateral view, of a prototype of monolithic folded pendulum, positioned horizontally as described in [9]

In FIG. 4, the reference F refers to the support or "frame", which presents a base, the reference PM to the test mass with an oscillation direction, the reference IP to the inverted pendulum (arm) and the reference SP to the simple pendulum (arm), G instead refers to a generic junction. The above arms connect the test mass PM to the support F. The arms can be, at rest, perpendicular to said base or not perpendicular to said base.

To the test mass PM a further mass CM can be added, which is not produced starting from the same monolithic block, termed calibration mass, to be used for the frequency calibration of the system (variation of the frequency of natural resonance).

In particular, a monolithic implementation of such folded pendulum has been chosen to the end of realizing a high mechanical quality factor, aimed at fostering the precision of the frequency measurement, as shown and discussed above.

To this end, all the mechanical components (oscillating parts and joints) has been realized by cut-machining by electro-erosion of an only material block.

The system so composed presents 4 flexible joints, each realized in pair (for a total number of 8 joints), to the end of limiting its torsional effects, minimizing the coupling between the horizontal longitudinal and transversal degrees of freedom.

The prototype of monolithic folded pendulum sensor of angular position has been realized by starting from an Aluminum metal block (Alloy 7075-T6) of 134 mm×140 mm×40 mm by precision mechanical machining. The technique of electro-erosion (EDM) has been used to separate the arm of the pendulum, the arm of the inverted pendulum and the central mass from the support. Also the four joints have been realized by electro-erosion cutting. Such joints have been realized with elliptical profile having minimal thickness equal to 100 μm with an ellipticity ratio equal to 16/5. The arms of the pendulums (of length 81.5 mm, distant from each other by 102 mm, spaced apart by 3.50 mm from the central mass and the support) are designed to minimize mass and inertia momentum without losing stiffness and symmetry.

The utilization of joints of the elliptic type, besides guaranteeing a high mechanical quality factor to the monolithic realizations, above all at low frequencies, confers a suitable robustness to the joint notwithstanding the reduced dimensions of the profile of the same [11-13]. Of course, a number of other geometrical configurations of the joints are possible and usable (for example, bearings or any other type of joint), which have different functionalities and characteristics, even in relation to the introduced thermal noise, which should constitute a line of principle the ultimate limit of sensitivity of the sensor itself.

Figure 5:
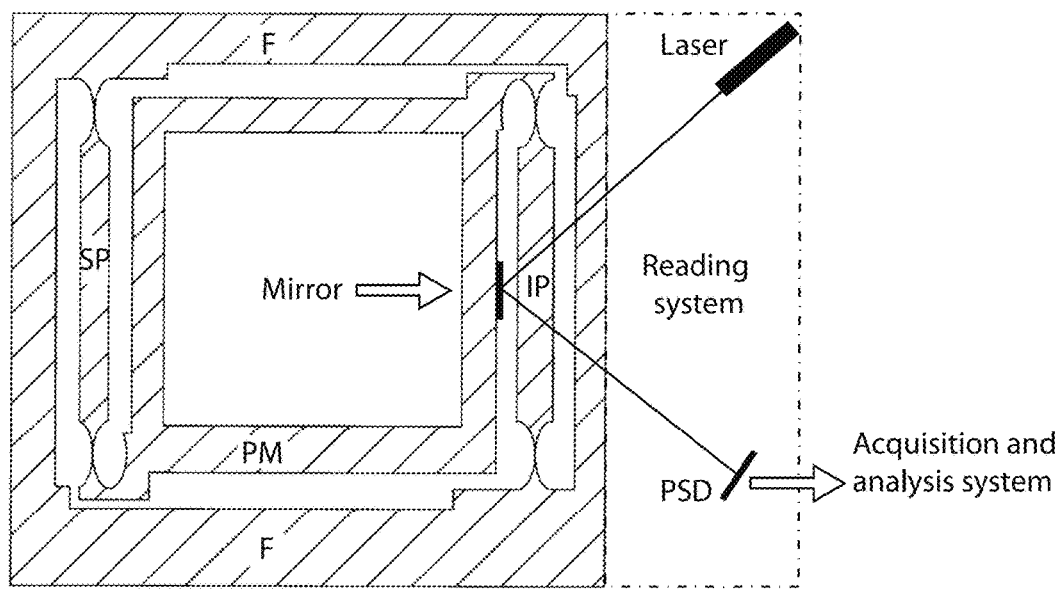
FIG. 5 shows a scheme of the reading system utilized in the experimental measurements, that is based on optical lever, introduced and utilized in a number of experimental applications [7-13], which, without any loss of generality, allow the demonstration of the functionality of the realized prototype.

The utilized reading system is the optical lever simple and robust one, introduced and utilized in a number of experimental applications [7-13], that, without any loss of generality, allows the demonstration of the functionality of the realized prototype. The realized scheme is reported in FIG. 5.

It is important to stress that the choice of the reading system to be used conditions the final sensitivity of the instrument (as well as the choice of its utilization in vacuum), so that reading systems that are more sensitive than the optical lever can certainly be utilized to increment the sensitivity of the instrument (for example systems based on a electrostatic detectors [4-6] or based on laser interferometry [7-13]). Of course these systems do not have any specific role in the methodology here described, which is totally independent from the utilized reading system.

In particular, the reading system based on the optical lever, which is not of course the most sensitive reading system, but is fully sufficient to the experimental demonstration of the validity of the proposed methodology, is, as a matter of fact, constituted by a laser beam, integral to the support of the sensor (fixed), pointed onto a mirror positioned on the central mass with an inclination, in the specific case, equal to 45°. The beam reflected by the mirror, in turn, impinges on a position sensing photodiode (PSD), that is itself also integral to the support of the sensor, that provides an output signal that one demonstrates being proportional to the relative position of the central mass with respect to the same support [7-9][11-13]. Such a signal is acquired by a digital acquisition system and, then, processed.

To the end of evaluating the effectiveness and functionality of the proposed technique, two series of measurements have been carried out (referring to the only positioning of the folded pendulum $FP_1$) in the two limiting situations:

a. presence of the only roll (β=0), i.e. rotation of the folded pendulum around the only axis X;

b. presence of the only pitch (α=0), i.e. rotation of the folded pendulum around the only Y axis.

The measurements have been performed in air, by positioning the angular position sensor prototype on a platform, whose inclination was being varied at each measurement acting on a piezoelectric actuator, positioned on one of the sides of the platform.

For the measurement of the resonance frequency of the folded pendulum in connection with the variation of the inclination angle, a very simple technique has been chosen which is fully sufficient to demonstrate the validity of the technique of extraction of the angular position signal described in this document. To this end, the effect of the forcing generated by a signal of the step type provided to the piezoelectric actuator has been used to vary the inclination of the sensor by a known angle. The data of the response to the step have been acquired in order to proceed seeking the resonance frequency of the system by minimization of the differences between the acquired signal (in the specific case the duration of the analyzed signal has been always of the order of two periods of the initial resonance frequency) and the response expected by the model of the folded pendulum that has allowed to derive the resonance frequency relative to the given inclination. Such a determination has been effected numerically on the signal acquired by the reading system with sampling frequency equal to 20 kHz and pre-filtered by a numerical pass band filter with amplitude defined by the range of resonance frequencies interested by the measurement of angular displacement, centered with respect to the initial resonance frequency of the sensor.

It is important to stress that the choice of the value of the quality factor Q in connection with the technique of extraction of the resonance frequency of the sensor, be it real-time signal extraction technique (aimed, for example, at realizing automatic control systems) or not, may condition the use of the sensor and/or its sensitivity, but it does not have any specific role in the here described methodology, which is totally independent from the techniques of detection of the resonance frequency of the same sensor.

The results of the two measurement series are reported in FIGS. 7 and 8, respectively.

In FIG. 7 the trend of the natural resonance frequency of the folded pendulum is reported both for positive and negative roll angles. From this figure one derives that the proposed model justifies fully the experimental data, being by the way the effectively measured function an "even" function. Moreover, it is further important to stress that these variations go beyond any usable theoretical model.

In FIG. 8, it is instead reported the trend of the natural resonance frequency of the folded pendulum both for positive and negative pitch angles. It is important to stress that in this case the dependency on the pitch angle, $\beta$, is a "monotonous" function referred to the horizontal orientation of the support of the folded pendulum. This justifies the trend of the theoretical function and the experimental measurements reported in FIG. 8, which confirm such variations beyond any usable theoretical model.

Any other orientation can be described by a generic pair of angles, $(\alpha,\beta)$. In FIG. 6 the theoretical trend of the resonance frequency is reported for a typical folded pendulum as a function of the roll angle, $\alpha$, and pitch angle, $\beta$.

Figure 9:
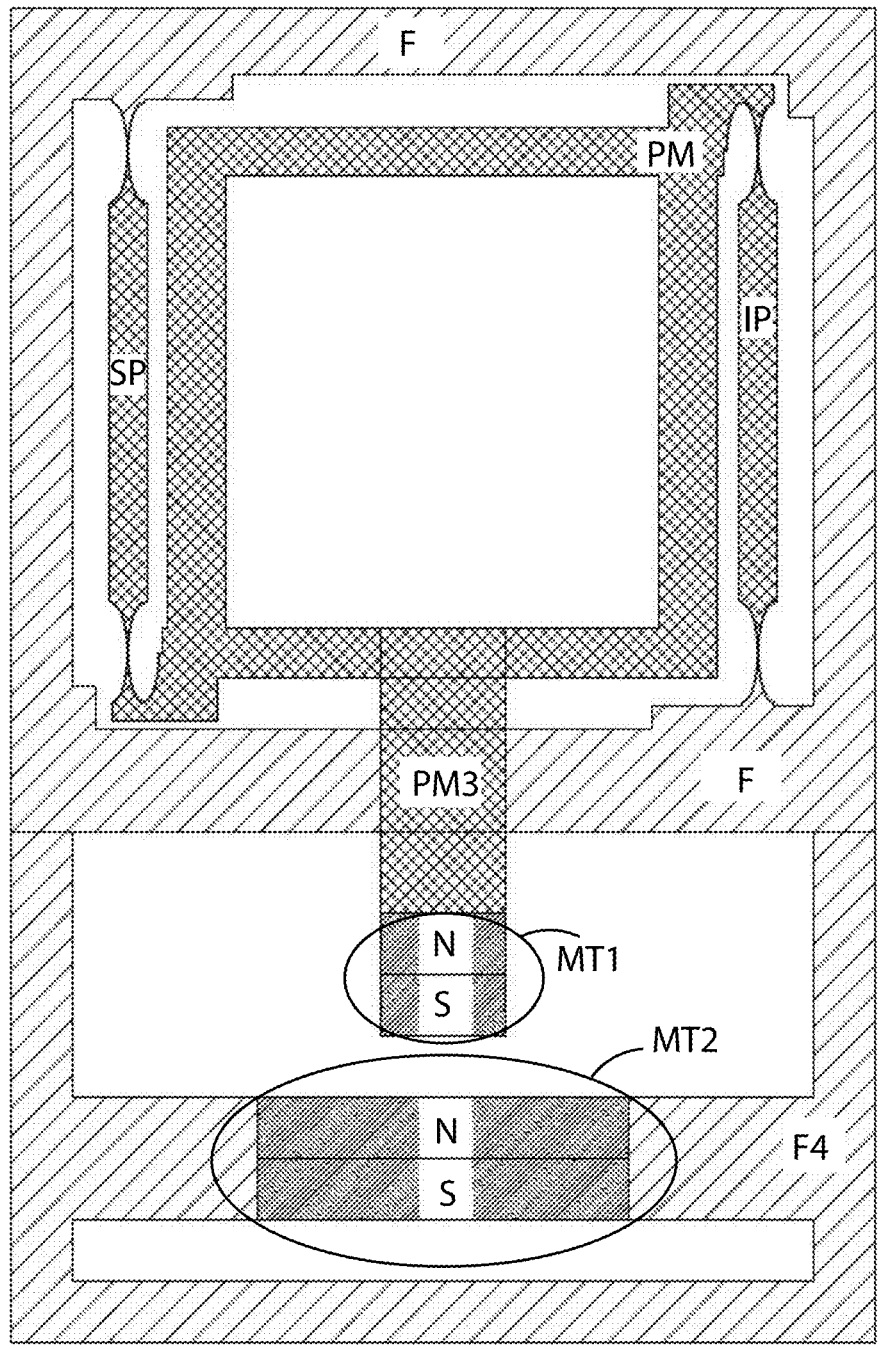
FIG. 9 shows a lateral view of a scheme of a horizontal monolithic folded pendulum on which an attractive constant magnetic force has been applied between the base of the sensor and the central mass PM generated by a configuration with permanent magnets MT1, applied to the central mass PM by means of connection PM3 and MT2 applied to the support F-F4.

It is appropriate to observe that what has been described applies in presence of a gravitational field, that can also be generated artificially by a force external to the pendulum (for example for use in the absence of terrestrial gravity). The external force can be for example a magnetic force as in FIG. 9.

When the direction of oscillation of the test mass has been described as oriented along an axis, the oscillation direction can be a long that axis or parallel to that axis.

The fact that the rotation axis is a combination of two different directions means that it can be one or the other of the two directions or an intermediate direction in the plane defined by the two directions.

The pre-defined trend of the resonance frequency can be derived from the Lagrangian $\Lambda$ analytically or numerically.

With "oscillation" of the pendulum it is to be understood a test mass displacement having oscillatory nature and not static nature.

The above mechanical stress is such to excite one or more oscillation frequencies of the test mass. Among such frequencies there must be the fundamental resonance frequency of the pendulum. The mechanical stress can have a natural origin, such as for example a microseism, or an artificial origin. The excitation of the oscillating mass can be an excitation of the oscillating type, and therefore provided with a certain frequency; however, it can be an excitation provided with more than one frequency (even with "infinite" frequencies (white noise). The excitation of the central mass of the folded pendulum can be of the oscillating type with single frequency (but variable to guarantee an appropriate oscillation in such a way to be adapted to the instantaneous frequency of the folded pendulum by a control system) but also, more easily, a white noise or a noise with any spectral distribution characterized by a frequency band whose range includes the natural resonance frequencies expected for the folded pendulum, defined in the range of angular displacements that one wishes to monitor, and quantified by inversion of the function resonance frequency—angular displacement that is characteristic to the folded pendulum itself.

The fixing of FPs to the reference system XYZ can occur in many known ways, for example by fixing to a suitable support extended in the dimensions X, Y, Z.

The rotations, shift and the measurement thereof can for example be realized by step motors.

BIBLIOGRAPHY

[1] Fergusson, E. S. *US Nat. Museum Bull.* 228, 185 (1962).
[2] Fan, S., Cai Y., Wu S., and Luo, J., and Hsu, H. Response of a folded pendulum to tilt tides. *Physics Letters A* 256, 132-140, doi: 10.1016/S0375-9601(99)00223-6 (1999).
[3] Wu, S., Fan, S., and Luo, J. Folded pendulum tiltmeter. *Rev. Sci. Instrum.* 73, 2150-2156, doi: 10.1063/1.1469676 (2002).
[4] Bertolini, A., DeSalvo, R., Fidecaro, F. and Takamori, A. Monolithic Folded Pendulum Accelerometers for Seismic Monitoring and Active Isolation Systems. *IEEE Trans. on Geosci. And Rem. Sens.* 44, 273-276 doi: 10.1109/TGRS.2005.861006 (2006).
[5] Takamori, A., Bertolini, A., DeSalvo, R., Araya, A., Kanazawa, T., and Shinohara, M. Novel compact tiltmeter for ocean bottom and other frontier observations. *Meas. Sci. Technol.* 22, 115901, doi: 10.1088/0957-0233/22/11/115901 (2011).
[6] Bertolini, A., DeSalvo, R., Fidecaro, F., Francesconi, M., Marka, S., Sannibale, V., Simonetti, D., Takamori, A., Tariq, H. Mechanical design of a single-axis monolithic accelerometer for advanced seismic attenuation systems. *Nucl. Instr. and Meth. A* 556, 616-623, doi: 10.1016/j.nima.2005.10.117 (2006).
[7] Acernese, F., De Rosa, R., Giordano, G., Romano, R., Barone, F. Mechanical monolithic horizontal sensor for low frequency seismic noise measurement. *Rev. Sci. Instrum.* 79, 074501, doi:10.1063/1.2943415 (2008).
[8] Acernese F., Giordano, G., Romano, R., De Rosa, R., Barone, F., Tunable mechanical monolithic sensor with interferometric readout for low frequency seismic noise measurement. *Nucl Instrum. and Meth. A* 617, 457-458, ISSN: 0168-9002, doi: 10.1016/j.nima.2009.10.112 (2010).
[9] Barone, F., Giordano, G. Low frequency folded pendulum with high mechanical quality factor, and seismic sensor utilizing such a folded pendulum. International application published under the patent cooperation treaty (PCT). WO 2011/004413 A3 (2011).
[10] Barone, F., Giordano G., Acernese, F., Low frequency folded pendulum with high mechanical quality factor in vertical configuration, and vertical seismic sensor utilizing such a folded pendulum. International application under the patent cooperation treaty (PCT), IT No. RM2011A000220 (2011), PCT/IT2012/000112 (2012).
[11] Acernese, F., De Rosa, R., Giordano, G., Romano, R., Vilasi, S., Barone, F. Low Frequency—High Sensitivity Horizontal Inertial Sensor based on Folded Pendulum. *Journ of Phys. Conf. Series* 339, 012001 (p. 10), doi: 10.1088/1742-6596/363/1/012001 (2012).
[12] Acernese, F., De Rosa, R., Giordano, G., Romano, R., Barone, F. Low frequency/high sensitivity horizontal monolithic sensor. *Proc. SPIE* Vol. 8345, 83453F (p.9), doi: 10.1117/12.913389 (2012).

[13] Acernese, F., De Rosa, R., Garufi, F., Giordano, G., Romano, R., Barone, F. Tunable mechanical monolithic horizontal sensor with high Q for low frequency seismic noise measurement. *Journ. of Phys. Conf. Series* 228, p.0120351 (2010).

[14] d'Oreye, N. F., aim, W. Very high resolution long-baseline water-tube tiltmeter to record small signals from Earth free oscillations up to secular tilts. *Rev. Sci. Instrum.* 76 024501-1, doi: 10.1063/1.1844451 (2005).

[15] Anderson, G., Constable, S. Staudigel, Wyatt, F. K. A seafloor long-baseline tiltmeter. *J. Geophys. Res.* 102, 285, doi: 10.1029/97JB01586 (1997).

[16] Tolstoy, M., Constable, S., Orcutt, J., Staudigel, H., Wyatt, F. K., Anderson, G. Systematic along-axis tidal triggering of micro-earthquakes observed at 9_500 N East Pacific Rise. *Phys. Earth Planet. Inter.* 108, 129-141, doi: 10.1016/S0031-9201(98)00091-0 (1998).

[17] Xing, Y. Z., Schneider, F. A bubble-level tilt sensor with a large measurement range. *Sens. and Act.* 17, 339-344, doi: 10.1016/0250-6874(89)80019-8 (1989).

[18] Giazotto, A. Tilt meter as a tilt-independent accelerometer. *Phys. Lett. A* 376, 667-670, doi: 10.1016/j.physleta.2011.12.019 (2012).

[19] Venkateswara, K., Hagedorn, C. A., Turner, M. D., Arp, T., Gundlach, J. H. High-precision mechanical absolute-rotation sensor. arXiv:1401.4412v1 [physics.ins-det] 16 Jan. 2014 (2014).

[20] Bertolini A., High sensitivity accelerometers for gravity experiments, tesi di dottorato, XIII ciclo, Università di Pisa, LIGO-P010009-00-Z (2001).

[21] Liu, J., Li, J. and Blair, D. G., 1997. Vibration isolation performance of an ultra-low frequency folded pendulum resonator. *Phys. Lett. A* 228, 243-249, doi:10.1016/S0375-9601(97)00105-9 (1997).

[22] Oppenheim, A., Schafer, R. W., Digital Signal Processing, Prentice-Hall Ed., Englewood Cliffs, N.J., (1975).

[23] Eleuteri, A., Milano, L., De Rosa, R., Garufi, F., Acernese, F., Barone, F., Giordano, L., Pardi, S. Adaptive filters for detection of gravitational waves from coalescing binaries. Phys. Rev. D 73, 122004 (p.12), doi: 10.1103/PhysRevD.73.122004 (2006).

In the foregoing, preferred embodiments have been described and variation of the present invention have been suggested, but it is understood that those skilled in the art will be able to modify and change them without falling outside the relevant scope of protection, as defined by the enclosed claims. In particular, the single embodiments or optional features can be freely combined respecting the inventive concept underlying the invention.

The invention claimed is:

1. A method for the orientation of a plane on the local horizontal, i.e. on the plane perpendicular to the gravity force or the force of an equivalent conservative field, wherein an only folded pendulum or a first and a second folded pendulum is used, each of said an only folded pendulum, a first and a second folded pendulum comprising a support (F) with a base, a test mass (PM) with an oscillation direction, a simple pendulum arm (SP) and an inverted pendulum arm (IP) that connect the test mass (PM) to the support (F), the folded pendulum being positioned in such a way that said oscillation direction is along the X-axis of a reference system XYZ obtained by rotation from a reference system xyz, wherein the z-axis is along the direction of the gravity field or an equivalent conservative field, by the Tait-Bryan angles of roll $\alpha$, $\beta$ and yaw $\gamma$, or another equivalent angular rotations description, said first and second folded pendulum being positioned in such a way that said oscillation direction is along the X-axis for the first folded pendulum and along the Y-axis for the second folded pendulum, wherein, in the case of an only folded pendulum, the following steps are executed:

MO1. providing a resonance frequency-angular position calibration curve or a curve obtained by theoretical modeling of said folded pendulum;

MO2. rotating said XY plane around the X-axis by varying the roll angle $\alpha$, and concurrently measuring the resonance frequency of the folded pendulum, till the a maximum or a minimum of the measured resonance frequency is identified , the XY plane being eventually rotated around the X-axis so that by construction $\alpha$=0;

MO3. keeping the position of plane XY around the X-axis as assumed at the end of step MO2, rotating said XY plane by varying the angle $\beta$, and concurrently measuring the resonance frequency of the folded pendulum, till a value equal of the measured resonance frequency to the one corresponding to $\beta$=0 in the calibration curve or the curve obtained by theoretical modeling is identified;

whilst in the case of first and second folded pendulum only step MO2 is executed for the first and second folded pendulum respectively subsequently rotating plane XY around X-axis by varying the roll angle $\alpha$, and the second folded pendulum around the Y-axis by varying the pitch angle $\beta$.

2. The method according to claim 1, wherein the rotations of the XY plane around X, Y, and Z axes are stored, whereby the initial position of the plane is determined on the basis of said stored rotations and the fact that $\alpha$ and $\beta$ are vanishing in said horizontal position.

3. A method of orientation of a plane on the local horizontal, i.e. on the plane xy perpendicular to the gravity force or the force of an equivalent conservative field along a direction z, xyz being a reference system, wherein the method utilizes one or more folded pendulums, having respective directions of oscillation of the respective test masses, the respective directions of oscillation being not parallel, which comprise each a support (F) with a base, a test mass (PM) with an oscillation direction, a simple pendulum arm (SP) and an inverted pendulum arm (IP) that connect the test mass (PM) to the support (F), each folded pendulum being positioned in such a way that said direction of oscillation is along or parallel to plane XY of a reference system XYZ obtained by rotation from the system xyz by the Tait-Bryan angles of roll $\alpha$, pitch $\beta$ and yaw $\gamma$, or another equivalent angular description, and in that the following steps are executed:

NO1. rotating said XY plane around X e Y axes by arbitrary quantities;

NO2. rotating said XY plane around the Z-axis, and measuring the resonance frequencies of said one or more folded pendulums by respective measuring systems;

repeating the steps NO1 and NO2 till the variation of resonance frequencies measured in step NO2 is below a pre-determined threshold corresponding to a noise level of the respective measuring systems.

4. The method according to claim 3, wherein the rotations of the XY plane around X, Y, and Z axes are stored, whereby the initial position of the plane is determined on the basis of said stored rotations and the fact that $\alpha$ and $\beta$ are vanishing in said horizontal position.

5. A method for the measurement of the angular position and the linear displacement of a reference system XYZ with respect to a reference system xyz wherein the z-axis is along the direction of the gravitational field, the reference system XYZ being obtained by rotation of the system xyz by means of the Tait-Bryan angles of roll $\alpha$, pitch $\beta$ and yaw $\gamma$, or another equivalent angular rotations description, characterized in that the following steps are executed:

- ML1. providing a first folded pendulum, which is fixed to the reference system XYZ on the plane XY in such a way that the oscillation direction of its test mass lies on or is parallel to the XY plane, and has a known offset roll angle $\alpha_{o_1} \neq 0$ with respect to the XY plane;
- ML2. providing a second folded pendulum, which is fixed to the reference system XYZ on the plane XY in such a way that the oscillation direction of its test mass lies or is parallel to the XY plane, at a non-null angular distance from the oscillation direction of the test mass of the first pendulum, and has a known offset roll angle $\alpha_{o_1} \neq 0$ with respect to the XY plane;
- ML3. providing a third folded pendulum and fixed to the reference system XYZ on the plane XY in such a way that the direction of oscillation of its test mass lies or is parallel to the Z-axis;

wherein the first, second and third folded pendulum each comprise a support (F) with a base, a test mass (PM) with an oscillation direction, a simple pendulum arm (SP) and an inverted pendulum arm (IP) that connect the test mass (PM) to the support (F); and the following steps are further executed:

- ML4. measuring the linear displacements of the test masses of the first, second and third folded pendulum;
- ML5. measuring the angles $\alpha$ and $\beta$, using the first and second folded pendulum;
- ML6. projecting the plane XY onto the plane xy;
- ML7. measuring the angle between the projected X or Y axis and the x or y-axis respectively, said angle coinciding by construction with the angle $\gamma$;
- ML8. projecting the linear displacements measured in step ML4 into the reference system xyz by means of the Tait-Bryan angles $\alpha$, $\beta$, $\gamma$ as measured in steps ML5 and ML7.

6. The method according to claim 5, wherein in step ML7 the angle $\gamma$ is measured by making the plane rotate till the projected X and Y axes coincide with the x and y axes.

* * * * *